(12) United States Patent
Kawamata et al.

(10) Patent No.: US 9,126,594 B2
(45) Date of Patent: Sep. 8, 2015

(54) DRIVING ASSISTANCE APPARATUS

(75) Inventors: Shinya Kawamata, Mishima (JP); Osamu Ozaki, Mishima (JP); Takuya Kaminade, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/389,091

(22) PCT Filed: Mar. 30, 2012

(86) PCT No.: PCT/JP2012/058643
§ 371 (c)(1),
(2), (4) Date: Sep. 29, 2014

(87) PCT Pub. No.: WO2013/145274
PCT Pub. Date: Oct. 3, 2013

(65) Prior Publication Data
US 2015/0046038 A1    Feb. 12, 2015

(51) Int. Cl.
*G06F 19/00* (2011.01)
*B60W 30/09* (2012.01)
(Continued)

(52) U.S. Cl.
CPC .............. *B60W 30/09* (2013.01); *B60W 10/18* (2013.01); *B60W 10/20* (2013.01); *B60W 30/095* (2013.01);
(Continued)

(58) Field of Classification Search
CPC ..... B60W 30/09; B60W 10/18; B60W 10/20; G08G 1/09623
USPC ........... 701/25, 38, 41, 301, 470; 340/426.19, 340/426.28, 436, 988, 990, 995.14; 180/417, 422, 428, 441; 342/357.31, 342/457; 414/495, 678; 137/625.24; 33/264; 116/173; 455/404.2
See application file for complete search history.

(56) References Cited

U.S. PATENT DOCUMENTS 5,784,007 A * 7/1998 Pepper ........................ 340/933
6,015,193 A * 1/2000 Vogel et al. .................. 303/147
(Continued)

FOREIGN PATENT DOCUMENTS

JP     10-086697 A    4/1998
JP     2000-113398 A  4/2000
(Continued)

OTHER PUBLICATIONS

Gavrila et al., Real-Time Vision for Intelligent Vehicles, 2001, IEEE, p. 22-27.*
(Continued)

*Primary Examiner* — McDieunel Marc
(74) *Attorney, Agent, or Firm* — Sughrue Mion, PLLC

(57) ABSTRACT

To provide a driving assistance apparatus that can detect an intersection at which driving assistance is required with a high degree of precision so that the driving assistance can be provided more appropriately, a driving assistance apparatus 2 includes: a vehicle speed acquisition unit 64 that obtains information indicating a vehicle speed of a vehicle 1; an assistance condition determination unit 98 that determines whether or not an assistance activation condition, which is a condition for providing a driver of the vehicle 1 with driving assistance, is satisfied on the basis of whether or not a vehicle speed V obtained by the vehicle speed acquisition unit 64 is equal to or lower than a reference vehicle speed V1, and on the basis of information relating to an intersection or a preceding vehicle in front of the vehicle 1; and an assistance execution unit 100 that executes, as the driving assistance, assistance including at least one of warning issuance to the driver, braking control, and steering control when the assistance condition determination unit 98 determines that the assistance activation condition is satisfied.

42 Claims, 16 Drawing Sheets

(51) Int. Cl.

| | | |
|---|---|---|
| *G08G 1/16* | (2006.01) | |
| *B60W 50/14* | (2012.01) | |
| *B60W 10/20* | (2006.01) | |
| *B60W 30/095* | (2012.01) | |
| *B60W 30/18* | (2012.01) | |
| *B60W 10/18* | (2012.01) | |
| *G08G 1/0962* | (2006.01) | |
| *B60W 10/184* | (2012.01) | |

(52) U.S. Cl.
CPC ......... *B60W 30/18154* (2013.01); *B60W 50/14* (2013.01); *G08G 1/09623* (2013.01); *G08G 1/163* (2013.01); *G08G 1/166* (2013.01); *B60W 10/184* (2013.01); *B60W 2520/10* (2013.01); *B60W 2550/22* (2013.01); *B60W 2900/00* (2013.01)

(56) References Cited

U.S. PATENT DOCUMENTS

| | | | |
|---|---|---|---|
| 6,370,475 B1* | 4/2002 | Breed et al. | 701/301 |
| 6,526,352 B1* | 2/2003 | Breed et al. | 701/470 |
| 7,085,637 B2* | 8/2006 | Breed et al. | 701/38 |
| 8,094,040 B1* | 1/2012 | Cornett et al. | 340/902 |
| 8,301,108 B2* | 10/2012 | Naboulsi | 455/345 |
| 8,768,569 B2* | 7/2014 | Kim et al. | 701/36 |
| 2008/0015772 A1 | 1/2008 | Sanma et al. | |
| 2012/0140072 A1* | 6/2012 | Murashita et al. | 348/148 |
| 2014/0222280 A1* | 8/2014 | Salomonsson et al. | 701/28 |

FOREIGN PATENT DOCUMENTS

| | | |
|---|---|---|
| JP | 2003-151090 A | 5/2003 |
| JP | 2005-309797 A | 11/2005 |
| JP | 2008-021181 A | 1/2008 |
| JP | 2009-059208 A | 3/2009 |
| JP | 2010-020564 A | 1/2010 |
| JP | 2011-242343 A | 12/2011 |
| JP | 2012-008753 A | 1/2012 |
| JP | 2012-048293 A | 3/2012 |
| JP | 2012-048459 A | 3/2012 |

OTHER PUBLICATIONS

Zhu et al., A Design of the Automatic Anti-Collision System, 2009, IEEE, p. 1-4.*

* cited by examiner

DRIVING ASSISTANCE APPARATUS

TECHNICAL FIELD

The invention relates to a driving assistance apparatus.

BACKGROUND ART

Driving assistance apparatuses that provide a driver of a vehicle with various types of driving assistance during travel have been proposed in recent years. A vehicle display apparatus described in Patent Document 1, for example, is capable of displaying information relating to another vehicle at an intersection having poor visibility, and determines whether or not to display the information relating to the other vehicle on the basis of a detected vehicle speed of a host vehicle and a driving attitude of the driver. When the attitude of the driver is poor, the vehicle display apparatus issues a warning indicating the existence of an approaching vehicle or the like. Further, in an intersection travel safety system described in Patent Document 2, detecting means for detecting a vehicle or a person about to enter an intersection of a road is provided at the intersection, and information detected by the detecting means is transmitted to another vehicle about to enter the intersection in order to warn the other vehicle.

Patent Document 1: Japanese Patent Application Publication No. 2000-113398 (JP 2000-113398 A)

Patent Document 2: Japanese Patent Application Publication No. 2012-008753 (JP 2012-008753 A)

SUMMARY OF THE INVENTION

Depending on the condition of an intersection into which a vehicle is about to advance and peripheral traffic conditions, however, driving assistance may not be necessary, and when driving assistance is provided unnecessarily in such cases, the driving assistance may irritate the driver. Further, although it may be possible to provide appropriate driving assistance in accordance with actual traffic conditions in a case where driving assistance is provided after obtaining information relating to a crossing vehicle from an infrastructure side, as in Patent Document 2, this type of driving assistance is limited to intersections having infrastructure facilities such as traffic lights, and it remains difficult to provide appropriate assistance at other intersections.

The invention has been designed in consideration of the circumstances described above, and an object thereof is to provide a driving assistance apparatus that can detect an intersection at which driving assistance is required with a high degree of precision so that the driving assistance can be provided more appropriately.

To solve the problems described above and achieve the object, a driving assistance apparatus according to the invention includes: vehicle speed obtaining means for obtaining information indicating a vehicle speed of a vehicle; assistance condition determining means for determining whether or not an assistance activation condition, which is a condition for providing a driver of the vehicle with driving assistance, is satisfied on the basis of whether or not the vehicle speed obtained by the vehicle speed obtaining means is equal to or lower than a reference vehicle speed, and on the basis of information relating to an intersection or a preceding vehicle in front of the vehicle; and driving assistance means for executing, as the driving assistance, assistance including at least one of warning issuance to the driver, braking control, and steering control when the assistance condition determining means determines that the assistance activation condition is satisfied.

Further, in the driving assistance apparatus described above, the assistance condition determining means preferably determines that the assistance activation condition is satisfied when the vehicle speed is equal to or lower than the reference vehicle speed, the intersection in front of the vehicle is an unsignalized intersection, which is an intersection at which a traffic light is not disposed, and a travel condition of the vehicle is such that the vehicle is stopped at the unsignalized intersection or about to enter the unsignalized intersection.

Further, in the driving assistance apparatus described above, the assistance condition determining means preferably prohibits the driving assistance when the travel condition of the vehicle is such that the vehicle is not stopped at the unsignalized intersection or not about to enter the unsignalized intersection, even if the vehicle speed is equal to or lower than the reference vehicle speed.

Further, in the driving assistance apparatus described above, when the vehicle speed is equal to or lower than the reference vehicle speed but the travel condition of the vehicle is such that the vehicle is not stopped at the unsignalized intersection or not about to enter the unsignalized intersection, the driving assistance means preferably weakens an assistance level of the driving assistance in comparison with a case where the travel condition of the vehicle is such that the vehicle is stopped at the unsignalized intersection or about to enter the unsignalized intersection.

The driving assistance apparatus described above preferably further includes traffic light detecting means for detecting the traffic light, and the assistance condition determining means preferably prohibits the driving assistance when the traffic light detecting means detects the traffic light within a predetermined distance of the vehicle, even if the vehicle speed is equal to or lower than the reference vehicle speed.

The driving assistance apparatus described above preferably further includes traffic light detecting means for detecting the traffic light, and when the traffic light detecting means detects the traffic light within a predetermined distance of the vehicle and when the assistance condition determining means determines that the assistance activation condition is satisfied, the driving assistance means preferably weakens an assistance level of the driving assistance in comparison with a case where the traffic light is not detected within the predetermined distance of the vehicle.

The driving assistance apparatus described above preferably further includes sound collecting means for obtaining information relating to sounds on a periphery of the vehicle, including information relating to a sound emitted by the traffic light, and the traffic light detecting means preferably detects the traffic light on the basis of the information relating to the sound emitted by the traffic light, which is included in the sound information obtained by the sound collecting means.

The driving assistance apparatus described above preferably further includes image capturing means for obtaining image information from a periphery of the vehicle, and the traffic light detecting means preferably detects the traffic light on the basis of the image information obtained by the image capturing means.

Further, in the driving assistance apparatus described above, the assistance condition determining means preferably determines that the assistance activation condition is satisfied when the vehicle speed is equal to or lower than the reference vehicle speed and a preceding vehicle is not detected within a predetermined distance of the vehicle.

Further, in the driving assistance apparatus described above, the assistance condition determining means preferably prohibits the driving assistance when the preceding vehicle is detected within the predetermined distance of the vehicle, even if the vehicle speed is equal to or lower than the reference vehicle speed.

Further, in the driving assistance apparatus described above, when the vehicle speed is equal to or lower than the reference vehicle speed and the preceding vehicle is detected within the predetermined distance of the vehicle; the driving assistance means preferably weakens an assistance level of the driving assistance in comparison with a case where the preceding vehicle is not detected within the predetermined distance of the vehicle.

The driving assistance apparatus described above preferably further includes sound collecting means for obtaining information relating to sounds on a periphery of the vehicle, and the assistance condition determining means preferably detects the preceding vehicle on the basis of information relating to a sound emitted by the preceding vehicle, which is included in the sound information obtained by the sound collecting means.

The driving assistance apparatus described above preferably further includes image capturing means for obtaining image information from a periphery of the vehicle, and the assistance condition determining means preferably detects the preceding vehicle on the basis of the image information obtained by the image capturing means.

The driving assistance apparatus described above preferably further includes three-dimensional information obtaining means for obtaining three-dimensional information relating to an object on a periphery of the vehicle using detection waves, and the assistance condition determining means preferably detects the preceding vehicle on the basis of the three-dimensional information obtained by the three-dimensional information obtaining means.

The driving assistance apparatus described above preferably further includes communicating means capable of exchanging information with another vehicle, and the assistance condition determining means preferably detects the preceding vehicle on the basis of information transmitted from the preceding vehicle and received by the communicating means.

Further, in the driving assistance apparatus described above, when the vehicle speed is equal to or lower than the reference vehicle speed and a railway crossing is detected within a predetermined distance of the vehicle, the driving assistance means preferably weakens an assistance level of the driving assistance in comparison with a case where the railway crossing is not detected within the predetermined distance of the vehicle.

Further, in the driving assistance apparatus described above, when the vehicle speed is equal to or lower than the reference vehicle speed and a toll gate is detected within a predetermined distance of the vehicle, the driving assistance means preferably weakens an assistance level of the driving assistance in comparison with a case where the toll gate is not detected within the predetermined distance of the vehicle.

The driving assistance apparatus described above preferably further includes right/left turn waiting condition determining means for determining whether or not the vehicle is in a right/left turn waiting condition, and the assistance condition determining means preferably prohibits the driving assistance when the right/left turn waiting condition determining means determines that the vehicle is in the right/left turn waiting condition, even if the vehicle speed is equal to or lower than the reference vehicle speed.

The driving assistance apparatus described above preferably further includes right/left turn waiting condition determining means for determining whether or not the vehicle is in a right/left turn waiting condition, and when the vehicle speed is equal to or lower than the reference vehicle speed and the vehicle is determined by the right/left turn waiting condition determining means to be in the right/left turn waiting condition, the driving assistance means preferably weakens an assistance level of the driving assistance in comparison with a case where the vehicle is determined not to be in the right/left turn waiting condition.

The driving assistance apparatus described above preferably further includes: sound collecting means for obtaining information relating to sounds on a periphery of the vehicle; and turn signal operation detecting means for detecting a turn signal operation performed by the driver, and the right/left turn waiting condition determining means preferably determines that the vehicle is in the right/left turn waiting condition when an oncoming vehicle is detected on the basis of the sound information obtained by the sound collecting means and the turn signal operation is detected by the turn signal operation detecting means.

The driving assistance apparatus described above preferably further includes: image capturing means for obtaining image information from a periphery of the vehicle; and turn signal operation detecting means for detecting a turn signal operation performed by the driver, and the right/left turn waiting condition determining means preferably determines that the vehicle is in the right/left turn waiting condition when an oncoming vehicle is detected on the basis of the image information obtained by the image capturing means and the turn signal operation is detected by the turn signal operation detecting means.

The driving assistance apparatus described above preferably further includes: three-dimensional information obtaining means for obtaining three-dimensional information relating to an object on a periphery of the vehicle using detection waves; and turn signal operation detecting means for detecting a turn signal operation performed by the driver, wherein the right/left turn waiting condition determining means determines that the vehicle is in the right/left turn waiting condition when an oncoming vehicle is detected on the basis of the three-dimensional information obtained by the three-dimensional information obtaining means and the turn signal operation is detected by the turn signal operation detecting means.

With the driving assistance apparatus according to the invention, an intersection at which driving assistance is required can be detected with a high degree of precision, and as a result, more appropriate driving assistance can be provided.

MODES FOR CARRYING OUT THE INVENTION

Embodiments of a driving assistance apparatus according to the invention will be described in detail below on the basis of the drawings. Note that the invention is not limited to these embodiments. Further, constituent elements of the embodiments described below include elements that could be replaced easily by a person skilled in the art or substantially identical elements. Furthermore, a case in which a vehicle installed with the driving assistance apparatus according to the invention is used on a left-hand drive road will be described below. It is assumed that when the vehicle installed with the driving assistance apparatus according to the invention is used on a right-hand drive road, left and right indications in the following description will be switched appropriately.

First Embodiment

Figure 1:
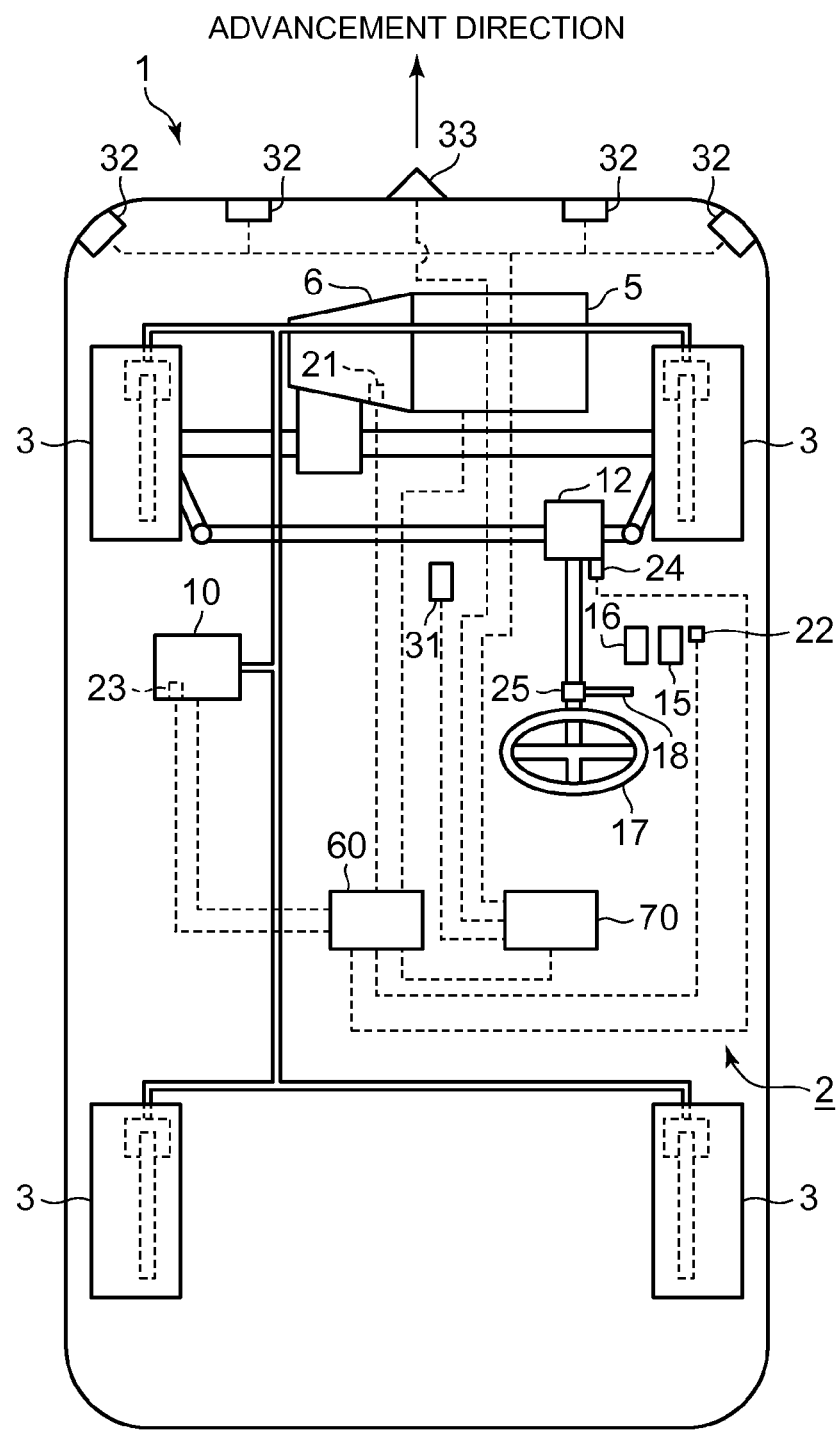
FIG. 1 is a schematic view of a vehicle including a driving assistance apparatus according to a first embodiment.

FIG. 1 is a schematic view showing a vehicle including a driving assistance apparatus according to a first embodiment. An engine 5 constituted by an internal combustion engine is installed as a power source in a vehicle 1 including a driving assistance apparatus 2 according to the first embodiment. Power generated by the engine 5 is transmitted to a vehicle wheel 3 via a driving apparatus such as a speed change apparatus 6, thereby enabling the vehicle 1 to travel. The vehicle 1 is further provided with a brake apparatus serving as braking means for braking the vehicle 1 during travel by applying a brake to the vehicle wheel 3, and a brake oil pressure control apparatus 10 that controls an oil pressure during an operation of the brake apparatus. Furthermore, the driving apparatus is provided with a vehicle speed sensor 21 serving as vehicle speed detecting means for detecting a vehicle speed by detecting a rotation speed of an output shaft of the driving apparatus.

The vehicle 1 is also provided with an accelerator pedal 15 and a brake pedal 16 that are used during a driving operation performed by a driver, and an accelerator sensor 22 that detects a depression amount of the accelerator pedal 15 is provided in the vicinity of the accelerator pedal 15. Further, the brake oil pressure control apparatus 10 is provided with a brake pressure sensor 23 that detects a depression amount of the brake pedal 16 by detecting a brake pressure, which is an oil pressure generated when the brake pedal 16 is depressed.

The vehicle 1 is further provided with a steering wheel 17 used by the driver to steer a steered wheel, and the steering wheel 17 is connected to an electric power steering (EPS) apparatus 12 serving as an EPS apparatus. Hence, the steering wheel 17 is provided to be capable of steering a front wheel serving as the steered wheel via the EPS apparatus 12. Furthermore, the EPS apparatus 12 thus provided includes a steering angle sensor 24 serving as steering angle detecting means for detecting a steering angle, i.e. a rotation angle, of the steering wheel 17.

Moreover, a turn signal lever 18 used to perform an operation to switch a flashing condition of a turn signal lamp (not shown) is provided in the vicinity of the steering wheel 17. An operation performed on the turn signal lever 18 can be detected by a turn signal switch 25 disposed in the vicinity of a base of the turn signal lever 18.

The vehicle 1 also includes, as environmental information obtaining means for obtaining environmental information relating to the periphery of the host vehicle 1, a camera 31, a travel sound sensor 32, and a radar sensor 33. Of these components, the camera 31 is provided as image capturing means for obtaining image information from the periphery of the vehicle 1 by capturing images of the periphery of the vehicle 1 in front of the vehicle 1 and so on. The camera 31 is disposed in the vehicle interior to be capable of capturing environment images of other vehicles, the road on which the vehicle 1 is traveling, and so on in front of the vehicle 1 through a front window, for example. The camera 31 also serves as a direct sensor capable of detecting a detection subject within a travel range of light emitted by the detection subject.

The travel sound sensor 32 is disposed in the vicinity of a front end of the vehicle 1 as sound collecting means for detecting sound information on the periphery of the vehicle 1 in order to obtain sound information. The travel sound sensor 32 is disposed in a plurality on a front side bumper of the vehicle 1 and so on, for example, so that peripheral sound information, including a sound direction, can be detected by the plurality of travel sound sensors 32. On the basis of the sound information transmitted thereto from the periphery of the vehicle 1 and reverberation of sounds emitted from the vehicle 1, the travel sound sensors 32 can detect the existence of an obstruction on the periphery of the vehicle 1, and the existence and approach direction of a moving body such as an approaching vehicle moving through a dead zone region of an intersecting road at an intersection positioned in front of the vehicle 1.

The radar sensor 33 is provided as three-dimensional information obtaining means for obtaining three-dimensional information relating to an object on the periphery, of the vehicle 1 using detection waves. The radar sensor 33 is disposed on a front surface of the front side bumper of the vehicle 1, and includes a transmission unit that transmits detection waves such as electromagnetic waves, infrared rays, laser, or ultrasonic waves, and a reception unit that receives reflection waves from the detection waves. The radar sensor 33 thus configured can detect a detection subject by transmitting detection waves from the transmission unit such that the detection waves are transmitted frontward and sideward from the front end of the vehicle 1, and receiving reflection waves from the detection waves that are reflected by the detection subject in the reception unit. In other words, the radar sensor 33 serves as a direct sensor capable of detecting a detection subject within a travel range of the detection waves.

Figure 2:
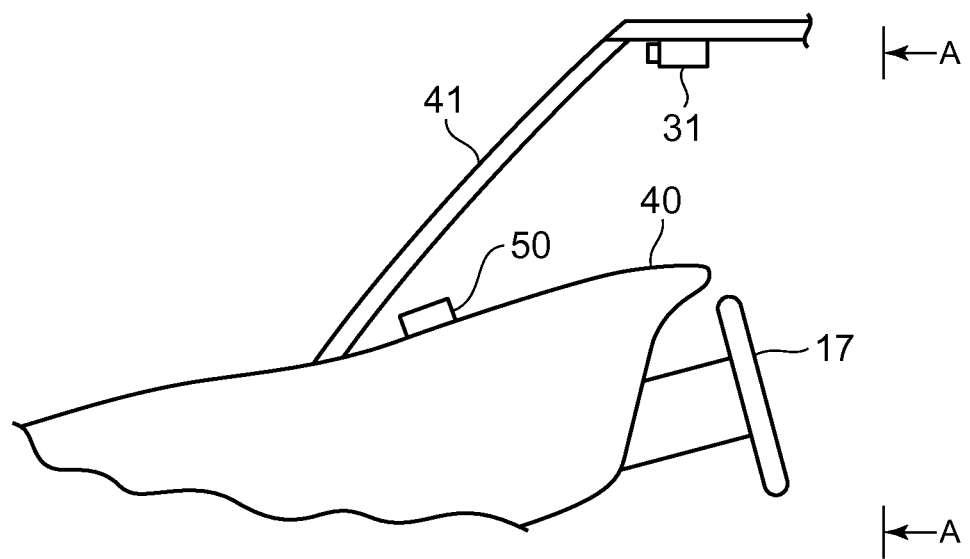
FIG. 2 is a schematic view of the interior of the vehicle shown in FIG. 1.
Figure 3:
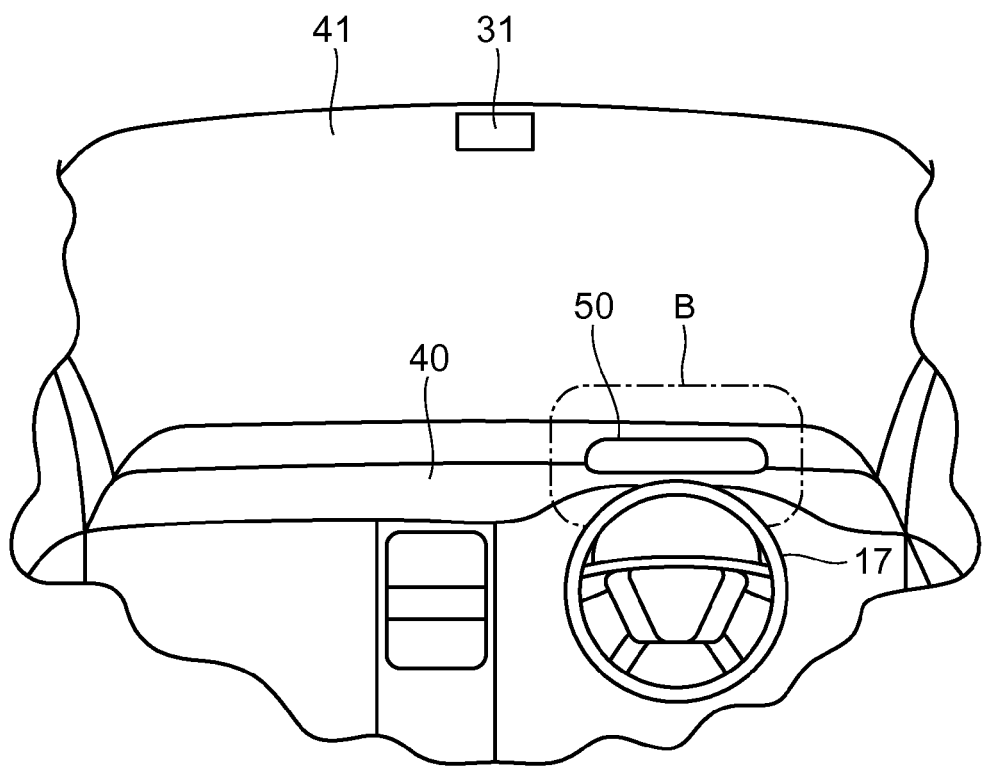
FIG. 3 is a view taken along an A-A arrow in FIG. 2.
Figure 4:
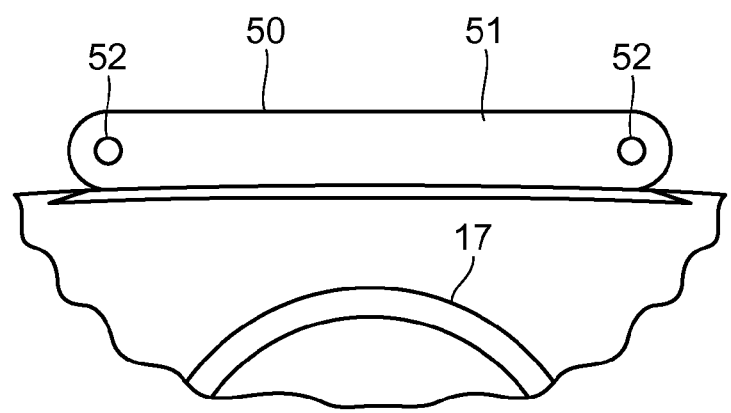
FIG. 4 is a view showing a B portion of FIG. 3 in detail.

FIG. 2 is a schematic view of the interior of the vehicle shown in FIG. 1. FIG. 3 is a view taken along an A-A arrow in FIG. 2. FIG. 4 is a view showing a B portion of FIG. 3 in detail. A warning apparatus 50 constituting driving assistance means for notifying the driver of predetermined information is disposed on a dashboard 40 in the vehicle interior. More specifically, the warning apparatus 50 is disposed on the dashboard 40 in the vicinity of a lower end of a front window 41. The warning apparatus 50 includes a display unit 51 that notifies the driver of the information visually, and a buzzer 52 that notifies the driver of the information aurally. By including the display unit 51 and the buzzer 52, the warning apparatus 50 is capable of providing driving assistance in the form of notification using sound and light.

The engine 5, the speed change apparatus 6, the brake oil pressure control apparatus 10, the EPS apparatus 12, the vehicle speed sensor 21, the accelerator sensor 22, the brake pressure sensor 23, the steering angle sensor 24, the travel sound sensors 32, and the warning apparatus 50 are connected to an electronic control unit (ECU) that is installed in the vehicle 1 in order to control respective parts of the vehicle 1. A travel control ECU 60 that performs travel control on the vehicle 1 and a driving assistance ECU 70 that performs driving assistance control, which is control for providing the driver with driving assistance while the vehicle 1 travels, are provided as the ECU.

Figure 5:
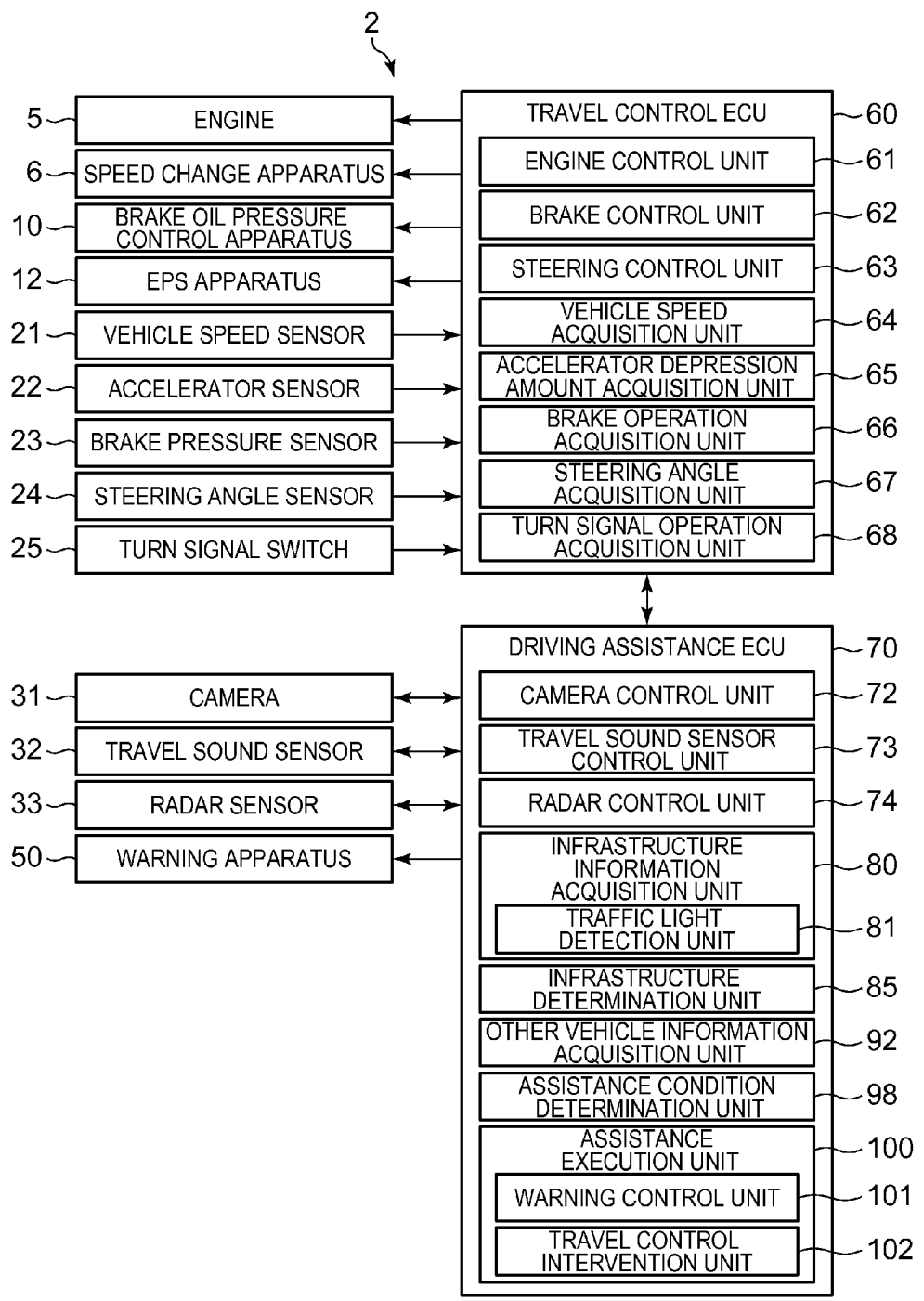
FIG. 5 is a view showing main parts of a configuration of the driving assistance apparatus shown in FIG. 1.

FIG. 5 is a view showing main parts of a configuration of the driving assistance apparatus shown in FIG. 1. Of the respective parts connected to the ECU, apparatuses such as the engine 5 and the brake oil pressure control apparatus 10, which are operated while the vehicle 1 travels, and detecting means for detecting travel conditions of the vehicle 1, such as the vehicle speed sensor 21, are connected to the travel control ECU 60. Detecting means for detecting conditions of driving operations performed by the driver, such as the accelerator sensor 22, the brake pressure sensor 23, the steering angle sensor 24, and the turn signal switch 25, are also connected to the travel control ECU 60. Apparatuses used in the driving assistance control, such as the camera 31 and the warning apparatus 50, on the other hand, are connected to the driving assistance ECU 70.

Further, the travel control ECU 60 and the driving assistance ECU 70 are connected to each other to be capable of exchanging information and signals. The travel control ECU 60 and the driving assistance ECU 70 have a conventional hardware configuration that includes a processing unit having a central processing unit (CPU) or the like, a storage unit such as a random access memory (RAM), and so on, and therefore description thereof has been omitted.

The travel control ECU 60 of the ECU includes an engine control unit 61 that controls an operation of the engine 5, a brake control unit 62 that controls a braking force by controlling the brake oil pressure control apparatus 10, a steering control unit 63 that controls steering by controlling the EPS apparatus 12, a vehicle speed acquisition unit 64 serving as vehicle speed obtaining means for obtaining vehicle speed information from a detection result obtained by the vehicle speed sensor 21, an accelerator depression amount acquisition unit 65 that obtains the accelerator depression amount, i.e. an operation amount of the accelerator pedal 15, from a detection result obtained by the accelerator sensor 22, a brake operation acquisition unit 66 that obtains the brake depression amount, i.e. an operation amount of the brake pedal 16, from a detection result obtained by the brake pressure sensor 23, a steering angle acquisition unit 67 that obtains a steering condition of the steering wheel 17 from a detection result obtained by the steering angle sensor 24, and a turn signal operation acquisition unit 68 that obtains an operation condition of the turn signal lever 18 on the basis of the condition of the turn signal switch 25. Of these components, the accelerator depression amount acquisition unit 65, the brake operation acquisition unit 66, the steering angle acquisition unit 67, and the turn signal operation acquisition unit 68 are provided as driving operation obtaining means for obtaining information indicating driving operations performed by the driver.

Further, the driving assistance ECU 70 includes a camera control unit 72 that controls the camera 31, a travel sound sensor control unit 73 that controls the travel sound sensors 32, a radar control unit 74 that controls the radar sensor 33, an infrastructure information acquisition unit 80 that obtains infrastructure information, which is information relating to the road on which the vehicle 1 is traveling, an infrastructure determination unit 85 that determines a condition of the infrastructure on the basis of the infrastructure information obtained by the infrastructure information acquisition unit 80, an other vehicle information acquisition unit 92 that obtains information relating to another vehicle traveling in the vicinity of the vehicle 1, an assistance condition determination unit 98 serving as assistance condition determining means for determining whether or not an assistance activation condition, which is a condition on which to provide the driver with driving assistance, is satisfied on the basis of whether or not the vehicle speed is equal to or lower than a reference vehicle speed and on the basis of information relating to an intersection ahead of the vehicle 1 or preceding vehicle information, and an assistance execution unit 100 constituting driving assistance means for executing assistance by which danger is avoided as the driving assistance.

Of these components, the infrastructure information acquisition unit 80 includes a traffic light detection unit 81 serving as traffic light detecting means for detecting a traffic light disposed on the road. The camera 31 and the travel sound sensors 32, for example, are used as the traffic light detecting means. Further, the assistance execution unit 100 includes a warning control unit 101 that activates the warning apparatus 50 to issue a warning to the driver, and a travel control intervention unit 102 that intervenes in the travel control performed on the vehicle 1 by the travel control ECU 60 by transmitting a control signal to the travel control ECU 60 in order to provide assistance by which danger is avoided.

Actions of the driving assistance apparatus 2 according to the first embodiment, having the above configuration, will now be described. During normal travel by the vehicle 1, the driver activates respective actuators of the engine 5, the brake oil pressure control apparatus 10, and so on by operating the accelerator pedal 15 and the brake pedal 16, and as a result, the vehicle 1 travels in accordance with the driving operations performed by the driver. For example, the engine control unit 61 provided in the travel control ECU 60 generates a driving force corresponding to a request from the driver by controlling the engine 5 in accordance with the accelerator depression amount obtained by the accelerator depression amount acquisition unit 65 on the basis of the detection result from the accelerator sensor 22.

Further, by operating the brake pedal 16, an oil pressure for activating the brake apparatus is generated by the brake oil pressure control apparatus 10, and by activating the brake apparatus using this oil pressure, a braking force is generated. The brake oil pressure, i.e. the oil pressure generated by the brake oil pressure control apparatus 10 in this manner when the brake pedal 16 is operated, is detected by the brake pressure sensor 23 and obtained by the brake operation acquisition unit 66. The brake operation acquisition unit 66 obtains the brake pressure as the brake depression amount of the driver. Furthermore, the operation condition of the turn signal lever 18, which is operated when the vehicle 1 turns right or left, changes lane, and so on while traveling, is obtained by having the turn signal operation acquisition unit 68 detect the condition of the turn signal switch 25, which is switched in response to an operation of the turn signal lever 18.

Further, travel conditions of the vehicle 1 are detected while the vehicle 1 travels by the sensors provided in the respective parts of the vehicle 1, and used during travel control of the vehicle 1. For example, the vehicle speed information detected by the vehicle speed sensor 21 is obtained by the vehicle speed acquisition unit 64 provided in the travel control ECU 60, and used during travel control performed using the vehicle speed information.

Moreover, the driving assistance apparatus 2 according to the first embodiment is capable of providing driving assistance by issuing a warning to the driver while the vehicle 1 is traveling. More specifically, driving assistance may be provided when the host vehicle 1 enters an intersection, where travel must be performed with greater care than during normal travel, to prevent an intersection collision with a moving body such as another vehicle traveling on a road that intersects the travel road of the host vehicle 1. The driving assistance provided by the driving assistance apparatus 2 is executed when the vehicle speed is equal to or lower than a predetermined speed and a predetermined condition is satisfied. The driving assistance takes the form of warning issuance by activating the warning apparatus 50, braking control by activating the brake oil pressure control apparatus 10, steering control by activating the EPS apparatus 12, and so on.

Figure 6:
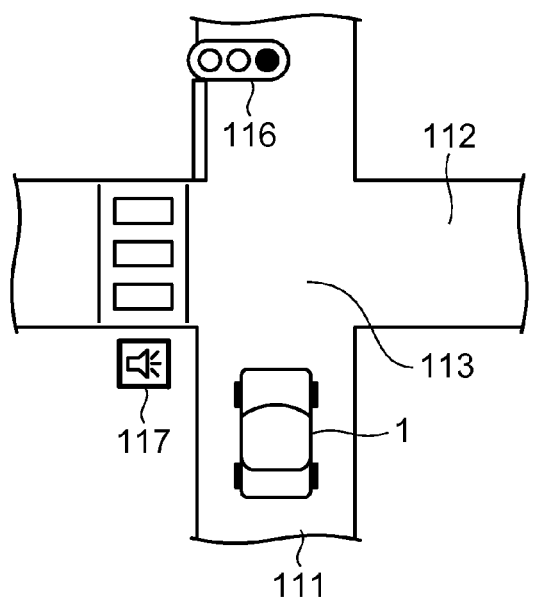
FIG. 6 is an illustrative view showing an intersection at which a traffic light is disposed.

FIG. 6 is an illustrative view showing an intersection at which a traffic light is disposed. To describe the driving assistance provided by the driving assistance apparatus 2, when the vehicle speed of the traveling vehicle 1 falls to or below a predetermined speed, infrastructure information and so on are obtained in relation to a travel road 111 serving as the road on which the host vehicle 1 is traveling, and on the basis of the obtained infrastructure information and so on, driving assistance is executed as required. In other words, if the infrastructure information and so on are in a condition indicating the need for driving assistance when the vehicle speed decreases to or below the predetermined speed, the driving assistance apparatus 2 provides driving assistance, and if the infrastructure information and so on are in not in this condition, driving assistance is not provided.

For example, driving assistance is not provided when a traffic light 116 exists at an intersection 113 between the travel road 111 serving as the road on which the host vehicle 1 is traveling and an intersecting road 112 intersecting the travel road 111. In other words, when the traffic light 116 exists at the intersection 113, all vehicles passing through the intersection 113, including the host vehicle 1, travel in accordance with signals from the traffic light 116, and therefore travel can be performed safely by traveling in accordance with the signals from the traffic light 116, without providing driving assistance.

The traffic light 116 may be detected on the basis of information indicating a sound emitted by the traffic light 116, for example. More specifically, recent traffic lights used by pedestrians often emit a sound from a pedestrian traffic light speaker 117 when the light turns green. Hence, the traffic light detection unit 81 provided in the infrastructure information acquisition unit 80 determines whether or not the traffic light 116 exists within a predetermined distance of the vehicle 1 by determining whether or not the sound information detected by the travel sound sensors 32 includes sound information from the pedestrian traffic light speaker 117. As a result, the traffic light 116 existing within the predetermined distance of the vehicle 1 is detected.

Figure 7:
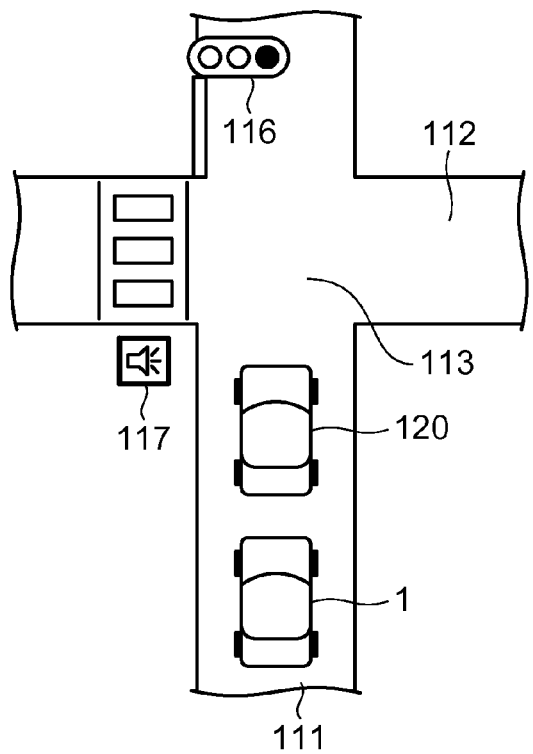
FIG. 7 is an illustrative view showing a case in which a preceding vehicle is present when entering an intersection.

FIG. 7 is an illustrative view showing a case in which a preceding vehicle is present when entering an intersection. When a preceding vehicle 120 serving as another vehicle exists in front of the host vehicle 1, the driver drives while paying attention to the preceding vehicle 120, and therefore travel is likewise performed with sufficient care. Furthermore, it is assumed that another vehicle traveling over/stopped at the intersection 113 will pay attention to the preceding vehicle 120, leading to a relative reduction in the danger of an intersection collision with the host vehicle 1, and therefore driving assistance is not provided even when the host vehicle 1 enters the intersection 113. The preceding vehicle 120 may also be detected on the basis of information indicating a sound emitted by the preceding vehicle 120, for example. In other words, the other vehicle information acquisition unit 92 provided in the driving assistance ECU 70 determines whether or not the preceding vehicle 120 exists in front of the vehicle 1 by determining whether or not the sound information detected by the travel sound sensors 32 includes sound information from the preceding vehicle 120.

Figure 8:
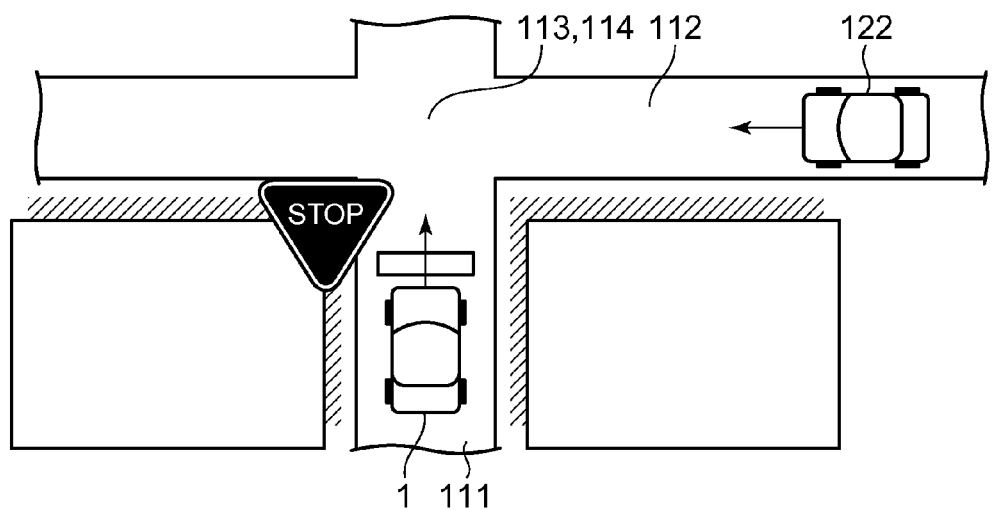
FIG. 8 is an illustrative view showing driving assistance provided when entering an intersection.

FIG. 8 is an illustrative view showing driving assistance provided when entering an intersection. Here, when the intersection 113 positioned in front of the vehicle 1 on the travel road 111 is an unsignalized intersection 114, i.e. an intersection 113 at which the traffic light 116 is not disposed, or the preceding vehicle 120 does not exist, driving assistance is provided as the vehicle 1 enters the intersection 113.

Infrastructure information relating to these elements is obtained by the infrastructure information acquisition unit 80 and the other vehicle information acquisition unit 92 provided in the driving assistance ECU 70 from the detection results obtained by the camera 31, the travel sound sensors 32, and the radar sensor 33, and when the vehicle speed falls to or below the predetermined speed, the assistance condition determination unit 98 determines whether or not the condition on which to provide assistance is satisfied on the basis of the obtained information. In other words, the assistance condition determination unit 98 determines whether or not the condition on which to provide driving assistance is satisfied on the basis of information relating to the intersection 113 and the preceding vehicle 120 in front of the host vehicle 1 when the vehicle speed falls to or below the predetermined speed.

The driver is provided with driving assistance by having the assistance execution unit 100 provided in the driving assistance ECU 70 execute warning issuance to the driver and driving assistance control such as braking control and steering control as the driving assistance provided by the driving assistance apparatus 2. For example, information relating to an approaching vehicle 122 traveling toward the host vehicle 1 on the intersecting road 112 is obtained on the basis of the sound information detected by the travel sound sensors 32 and the three-dimensional information detected by the radar sensor 33, and on the basis of the information obtained in relation to the approaching vehicle 122, the driver is notified of the approach of the approaching vehicle 122.

More specifically, as regards the sound information, information relating to sounds on the periphery of the host vehicle 1 is detected by controlling the travel sound sensors 32 using the travel sound sensor control unit 73 of the driving assistance ECU 70, and the sound information detected by the travel sound sensors 32 is obtained by the infrastructure information acquisition unit 80. Further, as regards the three-dimensional information, three-dimensional information relating to an object on the periphery of the host vehicle 1 is detected by controlling the radar sensor 33 using the radar control unit 74 of the driving assistance ECU 70, and the three-dimensional information detected by the radar sensor 33 is obtained by the infrastructure information acquisition unit 80.

A warning is issued to the driver during driving assistance by having the warning control unit 101 of the assistance execution unit 100 control the warning apparatus 50. The warning control unit 101 controls the warning apparatus 50 such that the existence of the approaching vehicle 122 on the intersecting road 112 is displayed by the display unit 51 of the warning apparatus 50 and a warning sound is issued from the buzzer 52 of the warning apparatus 50. As a result, driving assistance is provided to the driver in the form of a warning issued to the driver.

Further, braking control is performed during driving assistance by transmitting a control signal relating to the driving assistance from the travel control intervention unit 102 of the assistance execution unit 100 to the engine control unit 61 and the brake control unit 62. The engine control unit 61 and the brake control unit 62 control the engine 5 and the brake oil pressure control apparatus 10 on the basis of the control signal transmitted from the travel control intervention unit 102 to reduce a driving force and generate a braking force, and as a result, the host vehicle 1 is decelerated such that contact between the host vehicle 1 and the approaching vehicle 122 is avoided.

Furthermore, steering control is performed during driving assistance by transmitting a control signal relating to the driving assistance from the travel control intervention unit 102 to the steering control unit 63. The steering control unit 63 controls the EPS apparatus 12 on the basis of the control signal transmitted from the travel control intervention unit 102 to prompt the driver to steer and to generate steering torque, and as a result, an advancement direction of the host vehicle 1 is changed such that contact between the host vehicle 1 and the approaching vehicle 122 is avoided.

During this driving assistance performed when entering the intersection 113, an assistance level, or in other words an assistance strength, is varied according to infrastructure conditions, and the conditions of the host vehicle 1 and the approaching vehicle 122. For example, the assistance level is varied in accordance with the degree of care exhibited by the driver in each infrastructure condition, the vehicle speed when entering the intersection 113, the speed of the approaching vehicle 122 approaching the host vehicle 1, and so on. The assistance level of the driving assistance is varied by varying the strength of the warning issued to the driver and a control amount of the travel control performed on the host vehicle 1.

More specifically, during driving assistance in which a predetermined light is emitted by the display unit 51 of the warning apparatus 50, the assistance level of the driving assistance is varied by varying the light quantity or the color of the emitted light or by causing the light to flash. Further, during driving assistance in which a warning sound is emitted from the buzzer 52 of the warning apparatus 50, the assistance level of the driving assistance is varied by varying a volume or a frequency of the warning sound emitted by the buzzer 52. Furthermore, during driving assistance provided through braking control, the assistance level of the driving assistance is varied by varying the magnitude of the braking force, and during driving assistance provided through steering control, the assistance level of the driving assistance is varied by varying the magnitude of the steering torque or the magnitude of the steering angle.

Figure 9:
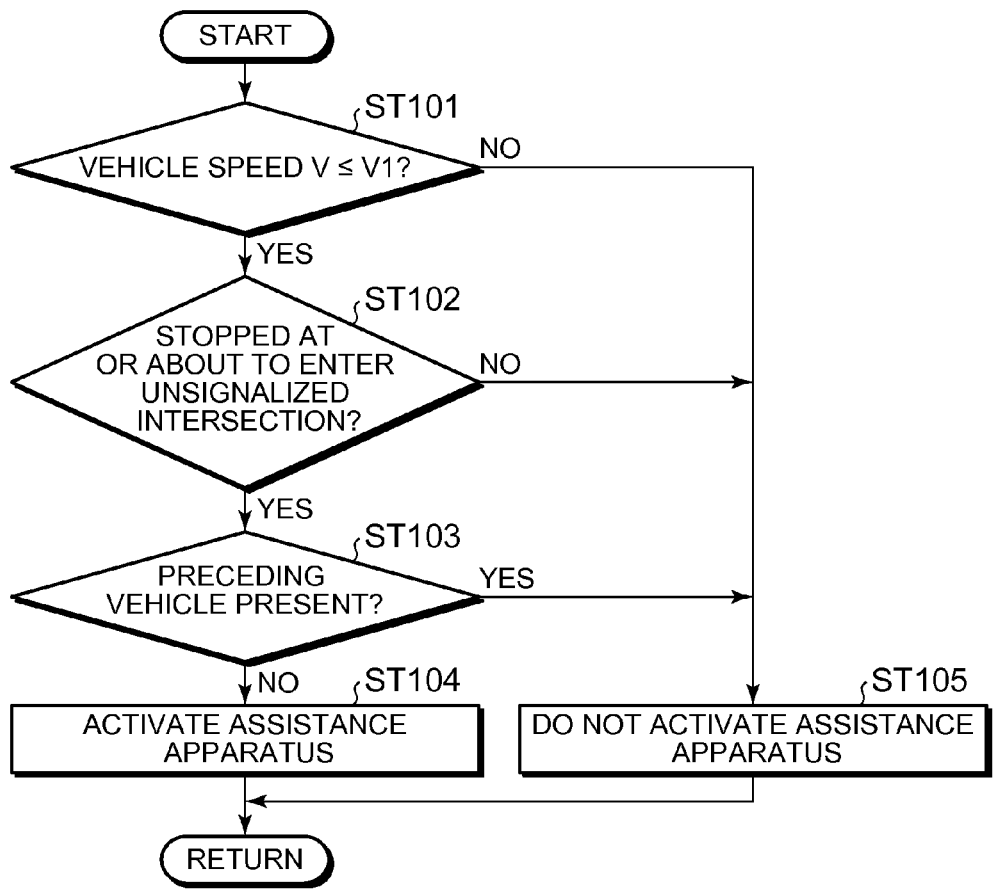
FIG. 9 is a flowchart executed by the driving assistance apparatus according to the first embodiment when providing driving assistance.

Next, an outline of processing procedures executed by the driving assistance apparatus 2 according to the first embodiment when providing driving assistance will be described. FIG. 9 is a flowchart executed by the driving assistance apparatus according to the first embodiment when providing driving assistance. Note that the following processing is called up and executed at predetermined time intervals during travel control on the vehicle 1. When the driving assistance flow is called up while the vehicle 1 is traveling, first, a determination is made as to whether or not vehicle speed $V \leq V1$ is established (step ST101). This determination is made by the assistance condition determination unit 98 of the driving assistance ECU 70.

The assistance condition determination unit 98 determines whether or not the vehicle speed V is equal to or lower than a predetermined reference vehicle speed V1 by comparing the current vehicle speed V, i.e. the vehicle speed information obtained by the vehicle speed acquisition unit 64 of the travel control ECU 60, with the reference vehicle speed V1. Note that the reference vehicle speed V1 is set in advance as a reference value used to determine the existence of an intersection 113 at which driving assistance is required on the basis of the vehicle speed, and stored in a storage unit of the driving assistance ECU 70.

When the assistance condition determination unit 98 determines that vehicle speed $V \leq V1$ is established (an affirmative determination in step ST101), a determination is made as to whether or not the vehicle 1 is stopped at the unsignalized intersection 114 or about to enter the unsignalized intersection 114 (step ST102). In other words, on the basis of whether or not the traffic light detection unit 81 has detected the traffic light 116 within the predetermined distance of the vehicle 1, the infrastructure determination unit 85 of the driving assistance ECU 70 determines whether or not the intersection 113 at which the vehicle 1 has decelerated to a stop or the intersection 113 that the vehicle 1 is about to enter is the unsignalized intersection 114. On the basis of this determination, the assistance condition determination unit 98 determines whether or not the travel condition of the vehicle 1 is a travel condition in which the vehicle 1 is stopped at the unsignalized intersection 114 or about to enter the unsignalized intersection 114.

When it is determined from the determination of the assistance condition determination unit 98 that the vehicle 1 is stopped at the unsignalized intersection 114 or is about to enter the unsignalized intersection 114 (an affirmative determination in step ST102), a determination is made as to whether or not the preceding vehicle 120 exists (step ST103). More specifically, information relating to other vehicles on the periphery of the host vehicle 1, including the preceding vehicle 120, is obtained by the other vehicle information acquisition unit 92 on the basis of the sound information detected by the travel sound sensors 32, and on the basis of the obtained result, the assistance condition determination unit 98 determines whether or not the preceding vehicle 120 exists.

When it is determined from the determination of the assistance condition determination unit 98 that the preceding vehicle 120 does not exist (a negative determination in step ST103), the assistance apparatus is activated (step ST104). More specifically, warning is issued by having the warning control unit 101 provided in the assistance execution unit 100 of the driving assistance ECU 70 control the warning apparatus 50, and assistance is provided through braking control and steering control by having the travel control intervention unit 102 intervene in the braking control and the steering control performed by the brake control unit 62 and the steering control unit 63. As a result, the host vehicle 1 can travel safely through the intersection 113.

When, on the other hand, it is determined from the determination of the assistance condition determination unit 98 that vehicle speed V≤V1 is not established (a negative determination in step ST101), or that the vehicle 1 is not stopped at the unsignalized intersection 114 or about to enter the unsignalized intersection 114 (a negative determination in step ST102), or that the preceding vehicle 120 exists (an affirmative determination in step ST103), the assistance apparatus is not activated (step ST105). In other words, the assistance execution unit 100 does not perform driving assistance control such as warning issuance control, braking control, and steering control.

In the driving assistance apparatus 2 according to the first embodiment, described above, the assistance condition determination unit 98 determines whether or not assistance activation conditions on which driving assistance is provided, such as whether or not the current vehicle speed V is equal to or lower than the reference vehicle speed V1, as well as the information relating to the intersection 113 in front of the host vehicle 1 and the presence of the preceding vehicle 120, are satisfied, and when it is determined that the assistance activation conditions are satisfied, diving assistance is executed. Accordingly, driving assistance is not executed when the predetermined assistance activation conditions are not satisfied, and therefore execution of driving assistance in a situation where driving assistance is not required can be suppressed, thereby reducing driver irritation caused by unnecessary driving assistance. Hence, the intersection 113 at which driving assistance is required can be detected with a high degree of precision, and as a result, the driving assistance can be provided more appropriately.

Further, the assistance activation conditions are determined to be satisfied when the vehicle speed V is equal to or lower than the reference vehicle speed V1 and the travel condition of the vehicle 1 is such that the vehicle 1 is stopped at the unsignalized intersection 114 or about to enter the unsignalized intersection 114, and therefore the driving assistance can be provided only when required. In other words, at an intersection 113 at which the traffic light 116 is disposed, the respective vehicles passing through the intersection 113 travel in accordance with the condition of the traffic light 116, and therefore, even when the vehicle speed decreases, the need for driving assistance at this intersection 113 is low. Hence, when the vehicle 1 is not stopped at the unsignalized intersection 114 or the like, driving assistance is prohibited even after the vehicle speed decreases, and driving assistance is executed only when the vehicle 1 is stopped at the unsignalized intersection 114 or the like. In so doing, driver irritation due to unnecessary driving assistance can be reduced more reliably. Therefore, the intersection 113 at which driving assistance is required can be detected with a higher degree of precision, and as a result, the driving assistance can be provided more appropriately.

Furthermore, information relating to sounds on the periphery of the vehicle 1, including information relating to the sound emitted by the traffic light 116, is obtained by the travel sound sensors 32, and the traffic light detection unit 81 detects the traffic light 116 on the basis of the sound information obtained by the travel sound sensors 32. Therefore, the traffic light 116 can be detected easily. Hence, when the vehicle speed decreases, it is possible to determine easily whether or not the vehicle 1 is stopped at the unsignalized intersection 114 or about to enter the unsignalized intersection 114, and accordingly, driver irritation caused by unnecessary driving assistance can be reduced easily. Therefore, the intersection 113 at which driving assistance is required can easily be detected with a high degree of precision, and as a result, appropriate driving assistance can be provided.

Moreover, the assistance activation conditions are determined to be satisfied when the vehicle speed V is equal to or lower than the reference vehicle speed V1 and the preceding vehicle 120 is not detected within a predetermined distance of the vehicle 1, and therefore driving assistance can be provided only when required. In other words, when the preceding vehicle 120 exists, the driver of the host vehicle 1 drives while paying attention to the preceding vehicle 120 and other vehicles traveling on the intersecting road 112 travel while acknowledging the preceding vehicle 120, and therefore, even when the vehicle speed decreases, the need for driving assistance at this intersection 113 is low. Hence, when the preceding vehicle 120 is detected within the predetermined distance of the host vehicle 1, driving assistance is prohibited even after the vehicle speed decreases, and driving assistance is executed only when the preceding vehicle 120 is not detected. In so doing, driver irritation due to unnecessary driving assistance can be reduced more reliably. Therefore, the intersection 113 at which driving assistance is required can be detected with an even higher degree of precision, and as a result, the driving assistance can be provided even more appropriately.

Further, the assistance condition determination unit 98 detects the preceding vehicle 120 on the basis of the sound information obtained by the travel sound sensors 32, and therefore the presence of the preceding vehicle 120 can be determined easily when the vehicle speed decreases. Hence, irritation caused by unnecessary driving assistance can be reduced easily. Therefore, the intersection 113 at which driving assistance is required can be detected easily with a high degree of precision, and as a result, driving assistance can be provided appropriately.

Note that in the driving assistance apparatus 2 according to the first embodiment, the presence of the preceding vehicle 120 is determined (step ST103) after determining whether or not the vehicle 1 is stopped at the unsignalized intersection 114 or about to enter the unsignalized intersection 114 (step ST102), but the order of these determinations may be reversed. Further, the control performed during the driving assistance may be configured such that only one of these two determinations (ST102, ST103) is performed.

Second Embodiment

The driving assistance apparatus 2 according to a second embodiment is configured substantially identically to the driving assistance apparatus 2 according to the first embodiment, but differs in that the determination as to whether or not to execute the driving assistance includes determining the presence of a railway crossing or a toll booth. All other configurations are identical to the first embodiment, and therefore description of these configurations has been omitted while identical reference numerals are attached thereto.

Figure 10:
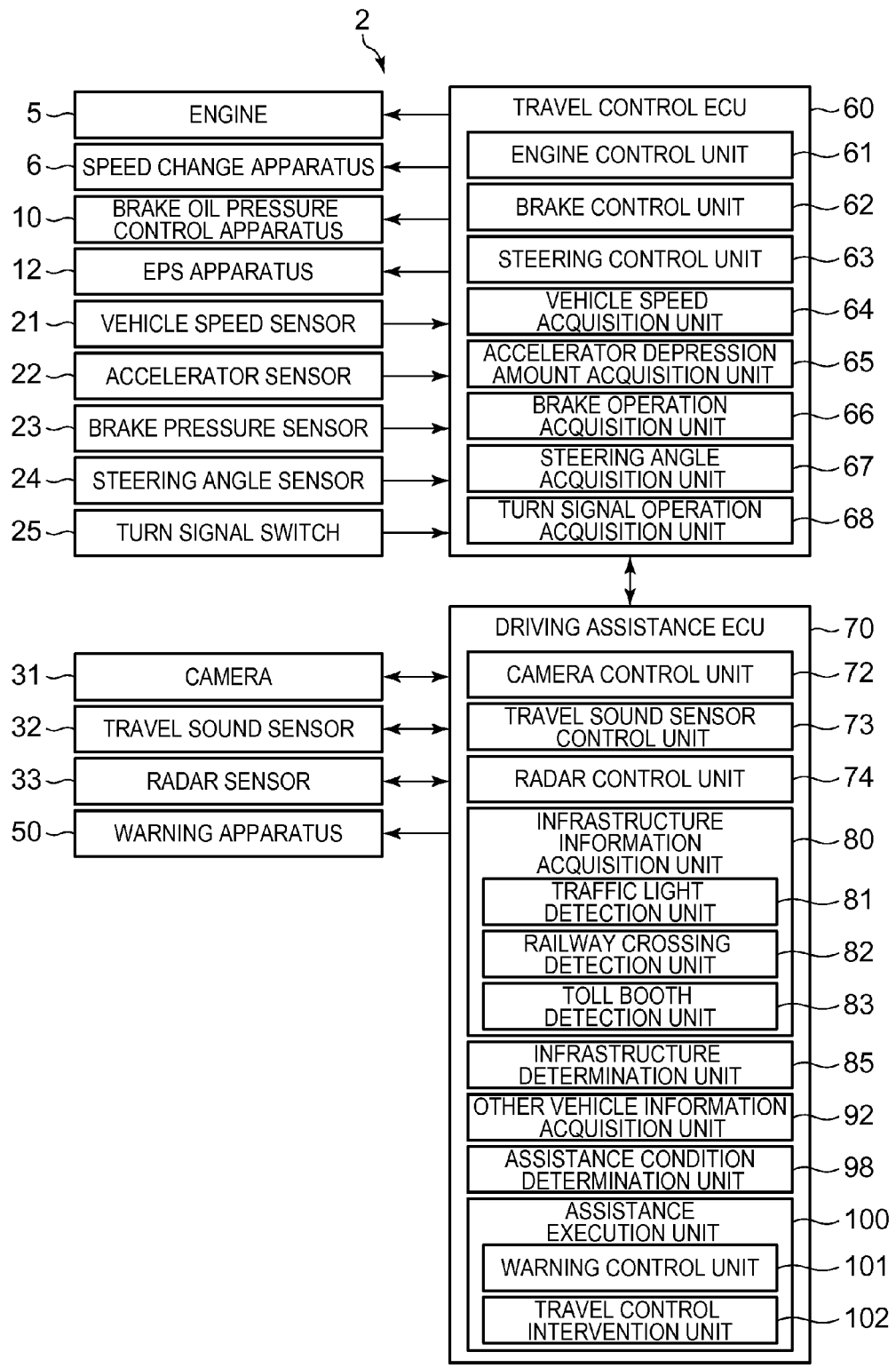
FIG. 10 is a view showing main parts of a configuration of a driving assistance apparatus according to a second embodiment.

FIG. 10 is a view showing main parts of the configuration of the driving assistance apparatus according to the second embodiment. The driving assistance apparatus 2 according to the second embodiment, similarly to the driving assistance apparatus 2 according to the first embodiment, includes the travel control ECU 60 and the driving assistance ECU 70, and is capable of providing driving assistance after determining whether or not the vehicle 1 is stopped at the intersection 113 at which driving assistance is required on the basis of the infrastructure condition, the travel condition of the vehicle 1, and so on. For this purpose, the camera 31 that obtains image information relating to the periphery of the vehicle 1 by capturing images of the periphery of the vehicle 1, the travel sound sensors 32 that obtain sound information by detecting sound information on the periphery of the vehicle 1, the radar sensor 33 that obtains three-dimensional information relating to objects on the periphery of the vehicle 1 using detection waves, the warning apparatus 50 that issues warnings to the driver, and so on are connected to the driving assistance ECU 70.

Further, as an assistance activation condition of the driving assistance apparatus 2 according to the second embodiment, in addition to the assistance activation conditions used by the driving assistance apparatus 2 according to the first embodiment, the need for driving assistance is determined using a determination condition relating to the presence of a railway crossing or a toll booth. Accordingly, the infrastructure information acquisition unit 80 provided in the driving assistance ECU 70 of the driving assistance apparatus 2 according to the second embodiment includes, in addition to the traffic light detection unit 81 for detecting the traffic light 116, a railway crossing detection unit 82 that detects a railway crossing transecting the travel road of the vehicle 1, and a toll booth detection unit 83 that detects a toll booth of a toll road or the like.

Actions of the driving assistance apparatus 2 according to the second embodiment, having the above configuration, will now be described. Similarly to the driving assistance apparatus 2 according to the first embodiment, while the vehicle 1 travels, the driving assistance apparatus 2 according to the second embodiment determines whether or not the assistance activation conditions are satisfied using the assistance condition determination unit 98 on the basis of the current vehicle speed and the infrastructure on the periphery of the vehicle 1. When it is determined from this determination that the assistance activation conditions are satisfied, the assistance execution unit 100 executes driving assistance by controlling the warning apparatus 50 and so on.

Figure 11:
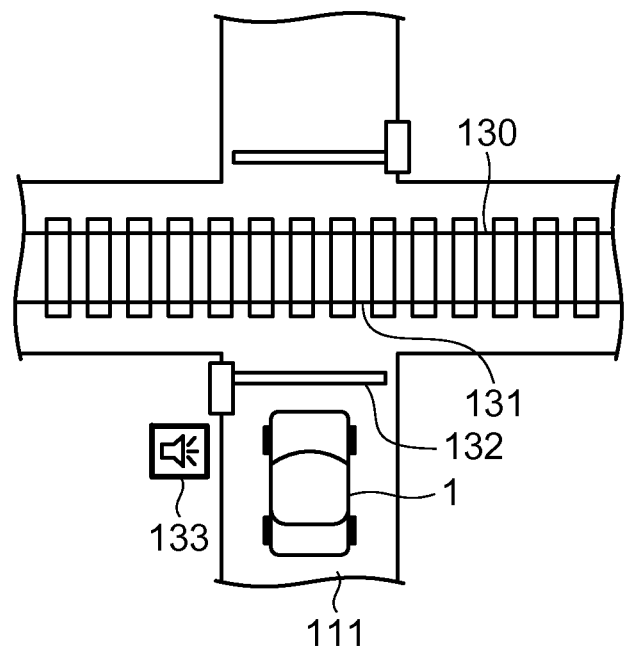
FIG. 11 is an illustrative view showing travel over a railway crossing disposed on a travel road.

FIG. 11 is an illustrative view showing travel over a railway crossing disposed on the travel road. When the vehicle 1 travels over a railway crossing 131 disposed on the travel road 111, which is transected by a railway line 130, the driving assistance apparatus 2 according to the second embodiment does not execute driving assistance. More specifically, when the vehicle 1 travels over the railway crossing 131, the driver of the vehicle 1 drives while paying closer attention to peripheral conditions, in particular trains traveling along the railway line 130, than during normal travel. Hence, when the vehicle 1 travels over the railway crossing 131, the driver drives the vehicle 1 while paying attention to the surroundings, and therefore driving assistance is not executed even after the vehicle speed decreases.

The railway line 130 is detected on the basis of information indicating a sound emitted by a crossing gate alarm 133, which is an alarm provided on a crossing gate 132 disposed in the vicinity of the railway crossing 131, for example. In other words, the railway crossing detection unit 82 of the infrastructure information acquisition unit 80 determines whether or not the sound information detected by the travel sound sensors 32 includes information indicating the sound emitted by the crossing gate alarm 133, and determines whether or not the railway crossing 131 exists in front of the vehicle 1 on the basis of the presence of sound information from the crossing gate alarm 133.

Figure 12:
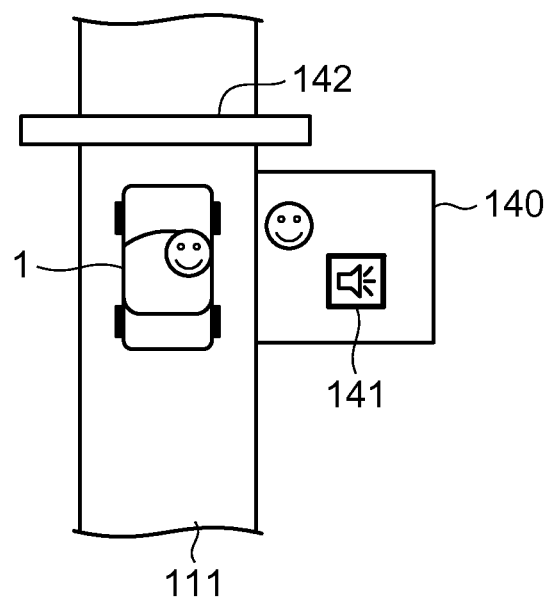
FIG. 12 is an illustrative view showing travel through a toll gate disposed on the travel road.

FIG. 12 is an illustrative view showing travel through a toll gate disposed on the travel road. The driving assistance apparatus 2 according to the second embodiment does not execute driving assistance likewise when the travel road 111 is a toll road or the like and the vehicle 1 travels through a toll gate 142 disposed on the travel road 111. More specifically, when the vehicle 1 travels through the toll gate 142, the vehicle 1 stops temporarily at a toll booth 140 to pay a toll or take a ticket at the toll booth 140, and if driving assistance is executed at this time, the driver will be irritated thereby. Hence, when the vehicle 1 travels through the toll gate 142, driving assistance is not executed even after the vehicle speed decreases.

The toll gate 142 is detected on the basis of sound information from a speaker 141 disposed in the toll booth 140 to state a toll or the like, or sound information indicating a conversation between an attendant of the toll booth 140 and the driver, for example. In other words, the toll booth detection unit 83 of the infrastructure information acquisition unit 80 determines whether or not the sound information detected by the travel sound sensors 32 includes information indicating the sound emitted by the speaker 141 or conversation sound at the toll booth 140, and determines whether or not the toll gate 142 exists in front of the vehicle 1 on the basis of the presence of this sound information.

Figure 13:
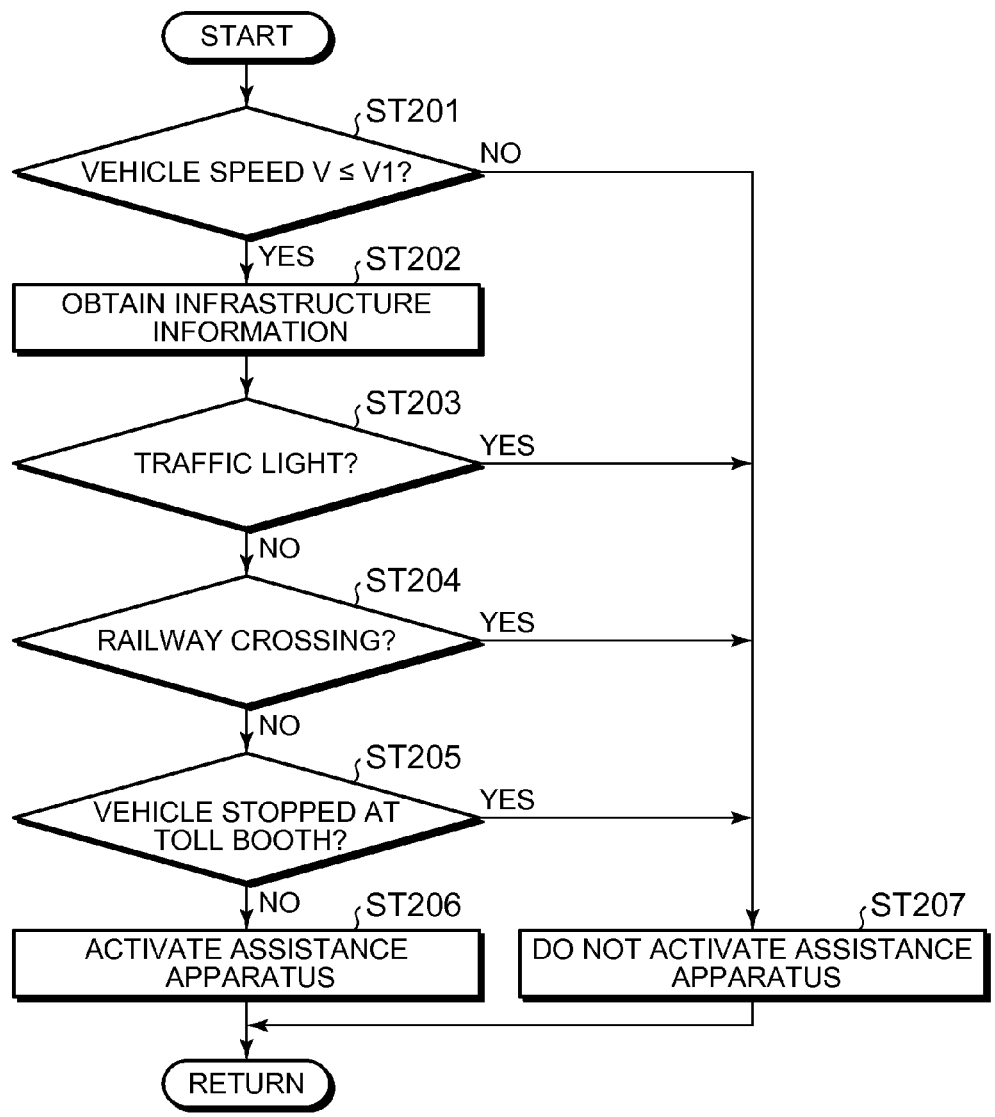
FIG. 13 is a flowchart executed by the driving assistance apparatus according to the second embodiment when providing driving assistance.

Next, an outline of processing procedures executed by the driving assistance apparatus 2 according to the second embodiment when providing driving assistance will be described. FIG. 13 is a flowchart executed by the driving assistance apparatus according to the second embodiment when providing driving assistance. When the driving assistance flow is called up while the vehicle 1 is traveling, first, a determination is made by the assistance condition determination unit 98 as to whether or not vehicle speed V≤V1 is established (step ST201).

When the assistance condition determination unit 98 determines that vehicle speed V≤V1 is established (an affirmative determination in step ST201), the infrastructure information is obtained (step ST202). The infrastructure information is obtained by having the traffic light detection unit 81, the railway crossing detection unit 82, and the toll booth detection unit 83 of the infrastructure information acquisition unit 80 detect the traffic light 116, the railway crossing 131, and the toll gate 142, respectively, on the basis of the sound information detected by the travel sound sensors 32.

Next, a determination is made as to whether or not the traffic light 116 is present (step ST203). This determination is made by the infrastructure determination unit 85 by determining whether or not the traffic light 116 exists within the predetermined distance of the vehicle 1 on the basis of the detection result from the traffic light detection unit 81.

When the infrastructure determination unit 85 determines that the traffic light 116 is not present (a negative determination in step ST203), next, a determination is made as to whether or not the railway crossing 131 is present (step ST204). This determination is made by the infrastructure determination unit 85 by determining whether or not the railway crossing 131 exists within the predetermined distance of the vehicle 1 on the basis of the detection result from the railway crossing detection unit 82.

When the infrastructure determination unit 85 determines that the railway crossing 131 is not present (a negative determination in step ST204), next, a determination is made as to whether or not the vehicle 1 is stopped at the toll booth 140 (step ST205). This determination is made by determining whether or not the vehicle 1 has decelerated to a stopped condition at the toll booth 140 by having the infrastructure determination unit 85 determine whether or not the toll gate 142 exists within the predetermined distance of the vehicle 1 on the basis of the detection result from the toll booth detection unit 83.

When the infrastructure determination unit 85 determines that the vehicle 1 is not stopped at the toll booth 140 (a negative determination in step ST205), the assistance apparatus is activated (step ST206). More specifically, when an approaching moving body such as another vehicle traveling on a road that intersects the travel road of the host vehicle 1 is detected by the camera 31, the travel sound sensors 32, the radar sensor 33, and so on, the assistance execution unit 100 of the driving assistance ECU 70 provides assistance through control for issuing a warning to the driver, braking control, and steering control in order to avoid an intersection collision between the host vehicle 1 and the approaching moving body. As a result, the host vehicle 1 can travel safely over the intersection 113.

When, on the other hand, it is determined by the assistance condition determination unit 98 that vehicle speed V≤V1 is not established (a negative determination in step ST201), or that the traffic light 116 is present (an affirmative determination in step ST203), or that the railway crossing 131 is present (an affirmative determination in step ST204), or that the vehicle 1 is stopped at the toll booth 140 (an affirmative determination in step ST205), the assistance apparatus is not activated (step ST207). In other words, the assistance execution unit 100 does not perform driving assistance control such as warning issuance control, braking control, and steering control.

With the driving assistance apparatus 2 according to the second embodiment, described above, driving assistance is prohibited when the railway crossing 131 is detected by the railway crossing detection unit 82, even after the vehicle speed V has fallen to or below the reference vehicle speed V1, and therefore driving assistance can be prohibited during travel in which the driver pays attention to the surroundings. Further, with the driving assistance apparatus 2 according to the second embodiment, driving assistance is prohibited when the toll booth 140 is detected by the toll booth detection unit 83, even after the vehicle speed V has fallen to or below the reference vehicle speed V1, and therefore driving assistance can be prohibited during a temporary stop to pay a toll or take a travel pass. Hence, during travel in which the driver pays attention to the surroundings and during a temporary stop at a location other than the intersection 113, driving assistance can be prohibited even after the vehicle speed has decreased, and therefore irritation caused by unnecessary driving assistance can be reduced more reliably. Accordingly, the intersection 113 at which driving assistance is required can be detected with an even higher degree of precision, and as a result, the driving assistance can be provided even more appropriately.

Note that in the driving assistance apparatus 2 according to the second embodiment, the determination as to whether or not the vehicle 1 is stopped at the toll booth 140 (step ST205) is made after determining the presence of the railway crossing 131 (step ST204), but the order of these determinations may be reversed. Further, the control performed during the driving assistance may be configured such that only one of these two determinations (ST204, ST205) is performed.

Third Embodiment

The driving assistance apparatus 2 according to a third embodiment is configured substantially identically to the driving assistance apparatus 2 according to the first embodiment, but differs in that the determination as to whether or not to execute the driving assistance includes determining whether or not the vehicle 1 is in a right/left turning condition. All other configurations are identical to the first embodiment, and therefore description of these configurations has been omitted while identical reference numerals are attached thereto.

Figure 14:
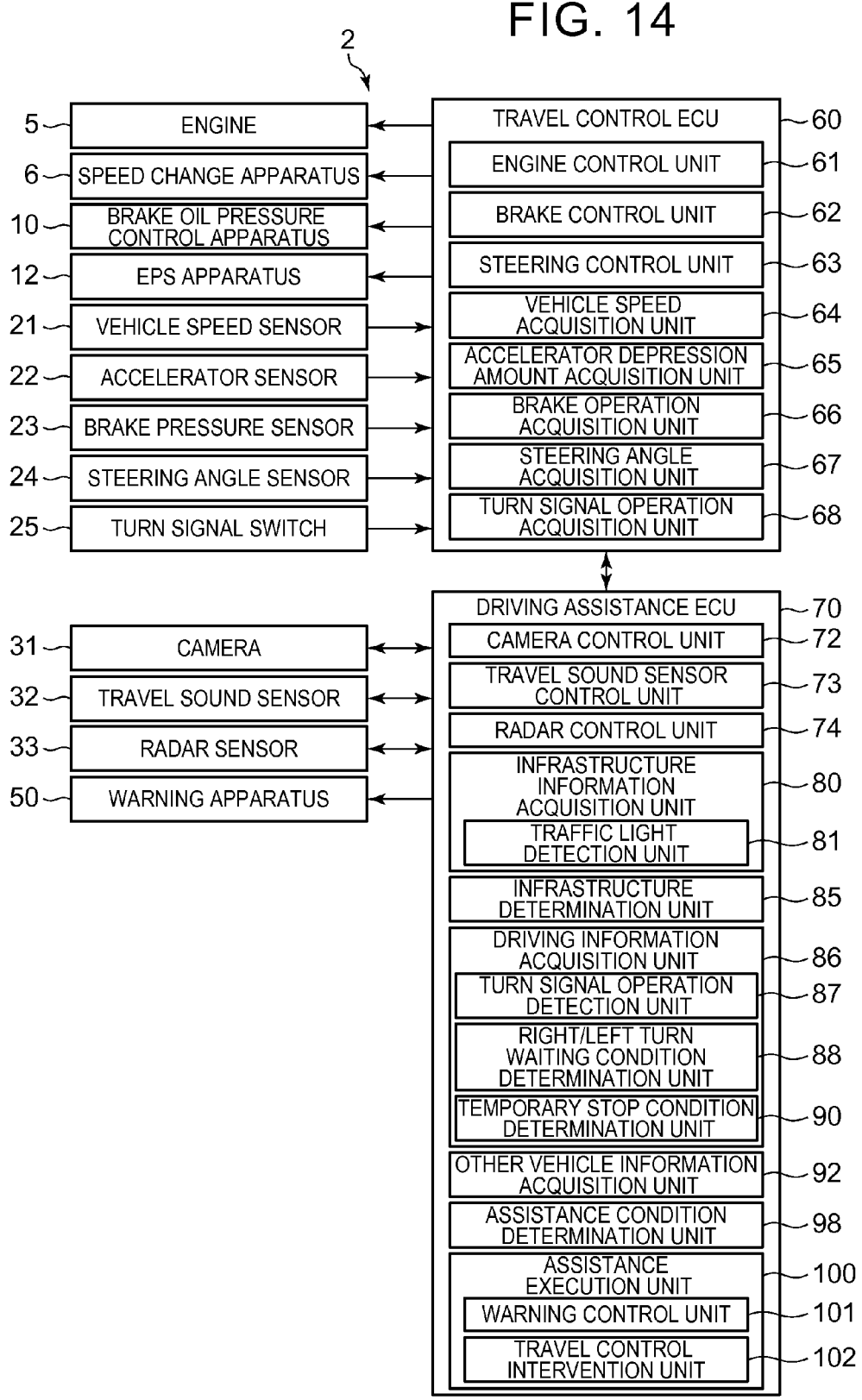
FIG. 14 is a view showing main parts of a configuration of a driving assistance apparatus according to a third embodiment.

FIG. 14 is a view showing main parts of the configuration of the driving assistance apparatus according to the third embodiment. The driving assistance apparatus 2 according to the third embodiment, similarly to the driving assistance apparatus 2 according to the first embodiment, includes the travel control ECU 60 and the driving assistance ECU 70, and is capable of providing driving assistance after determining whether or not the vehicle 1 is stopped at the intersection 113 at which driving assistance is required on the basis of the infrastructure condition, the travel condition of the vehicle 1, and so on.

Further, as assistance activation conditions of the driving assistance apparatus 2 according to the third embodiment, in addition to the assistance activation conditions used by the driving assistance apparatus 2 according to the first embodiment, the need for driving assistance is determined by determining whether or not the host vehicle 1 is in a right turning or left turning condition, and determining whether or not the vehicle 1 is temporarily stopped. For this purpose, the driving assistance ECU 70 of the driving assistance apparatus 2 according to the third embodiment includes a driving information acquisition unit 86 that obtains information relating to the driving operations performed by the driver, and the driving information acquisition unit 86 includes a turn signal operation detection unit 87 serving as turn signal operation detecting means for detecting a turn signal operation performed by the driver, a right/left turn waiting condition determination unit 88 serving as right/left turn waiting condition determining means for determining whether or not the vehicle 1 is in a Tight/left turn waiting condition, and temporary stop condition determining means 90 that determine whether or not the vehicle 1 is temporarily stopped.

Actions of the driving assistance apparatus 2 according to the third embodiment, having the above configuration, will now be described. Similarly to the driving assistance apparatus 2 according to the first embodiment, while the vehicle 1 travels, the driving assistance apparatus 2 according to the third embodiment determines whether or not the predetermined assistance activation conditions are satisfied, and executes driving assistance after determining that the assistance activation conditions are satisfied.

Further, the driving assistance apparatus 2 according to the third embodiment executes driving assistance in accordance with the condition of the intersection 113 and the condition of the vehicle 1 about to travel over the intersection 113. For example, the need for driving assistance is determined on the basis of whether or not the intersection 113 at which the vehicle 1 is stopped, or which the vehicle 1 is about to enter, is a large intersection, and when the intersection 113 is a large intersection, driving assistance is not executed. Note that in this case, a large intersection is an intersection 113 at which a plurality of lanes exist on at least the side of the travel road 111 on which the host vehicle 1 is traveling, from among roads constituting the intersection 113 at which the vehicle 1 is stopped or which the vehicle 1 is about to enter.

In the driving assistance apparatus 2 according to the third embodiment, the determination as to whether or not the intersection 113 is a large intersection is made by having the infrastructure determination unit 85 determine, on the basis of the sound information obtained by the travel sound sensors 32, whether or not sounds are generated from a plurality of vehicles on the periphery of the host vehicle 1 in a stable manner within a fixed time period. In other words, the determination as to whether or not the intersection 113 is a large intersection is made on the basis of an amount of other vehicle traffic traveling on the periphery of the host vehicle 1. At a large intersection, the vehicle 1 travels over the intersection 113 in accordance with the traffic light 116, and et since travel is performed in accordance with the traffic light 116, travel can be performed safely without providing driving assistance. When the intersection 113 is determined to be a large intersection, therefore, driving assistance is prohibited.

Further, when a right turn or a left turn is performed at a large intersection, it may be necessary to wait for oncoming vehicles traveling on an opposing lane and pedestrians to pass even though a traffic light on the travel road 111 side indicates that travel over the intersection 113 is permitted, and in such cases, the right turn or left turn cannot be performed immediately. In this case, the vehicle speed may decrease such that the host vehicle 1 comes to a temporary stop. When a right turn or a left turn is performed, however, the driving operation of the driver is preferably prioritized, and therefore, during a right turn or a left turn, driving assistance is prohibited.

Right and left turns are determined on the basis of an operating condition of the turn signal lever 18 and the travel condition of other vehicles traveling on the periphery of the host vehicle 1. More specifically, the operating condition of the turn signal lever 18 is obtained by having the turn signal operation acquisition unit 68 of the travel control ECU 60 obtain the condition of the turn signal switch 25, which is switched using the turn signal lever 18. Further, conditions of overtaking vehicles overtaking the host vehicle 1 on the travel road 111 and oncoming vehicles traveling in an opposing lane are obtained by the other vehicle information acquisition unit 92 on the basis of the detection result from the travel sound sensors 32. The right/left turn waiting condition determination unit 88 of the driving information acquisition unit 86 determines whether or not the host vehicle 1 is in the right/left turn waiting condition on the basis of the condition of the turn signal lever 18 and the conditions of the overtaking vehicles and oncoming vehicles, whereupon the assistance condition determination unit 98 determines whether or not to execute the driving assistance on the basis of the result of this determination.

Furthermore, in the driving assistance apparatus 2 according to the third embodiment, driving assistance is prohibited when the host vehicle 1 stops temporarily on a road shoulder, despite the accompanying reduction in the vehicle speed. This temporary stop condition is determined on the basis of conditions of a hazard switch (not shown), a tail lamp (not shown) used during nighttime travel, and so on. More specifically, when an overtaking vehicle overtaking the host vehicle 1 is detected while the hazard switch is ON or the tail lamp is extinguished during nighttime travel, the temporary stop condition determination unit 90 of the driving information acquisition unit 86 determines that the host vehicle 1 is temporarily stopped. When it is determined in this manner that the host vehicle 1 is temporarily stopped, the assistance condition determination unit 98 determines that the driving assistance is to be prohibited.

Figure 15:
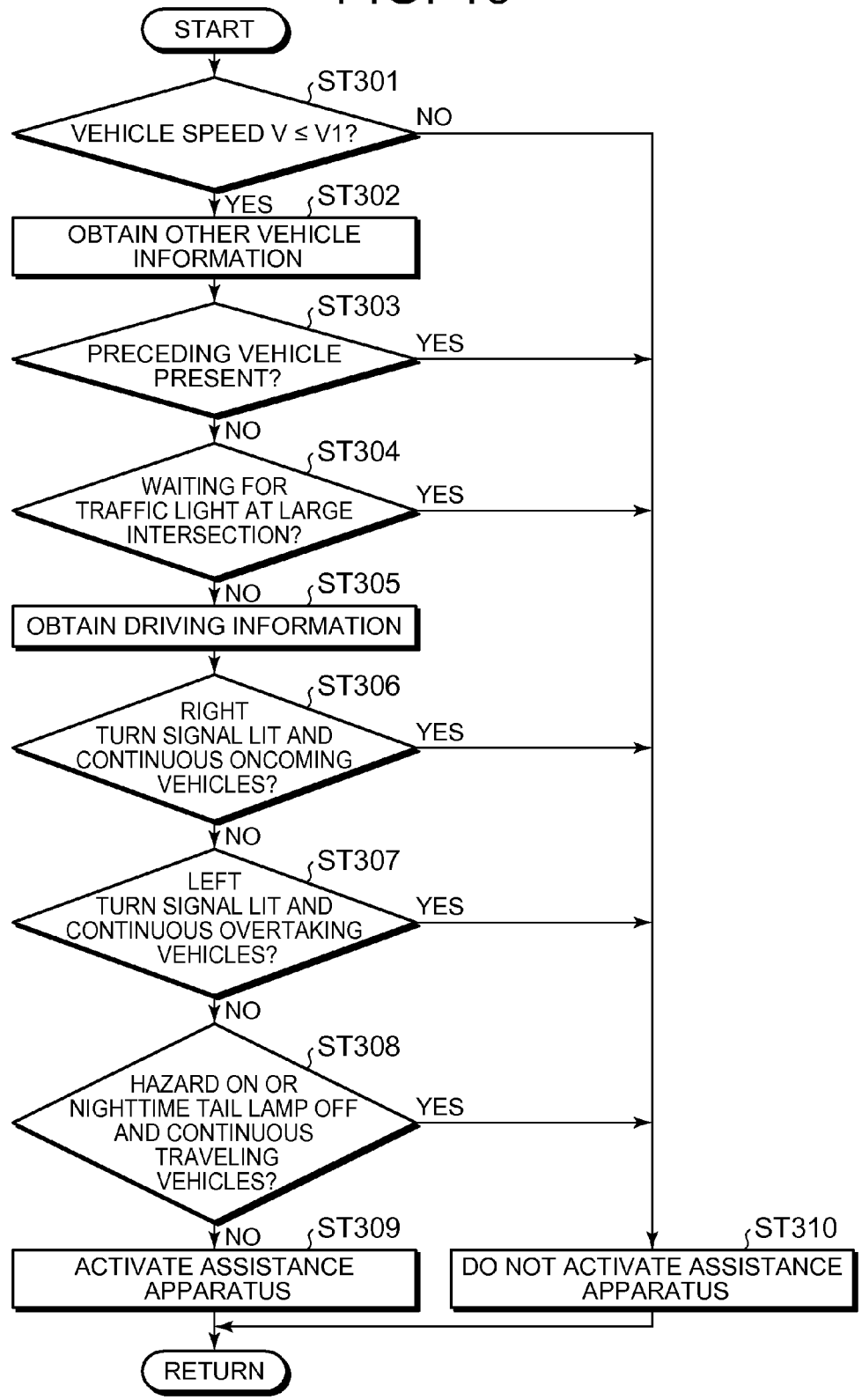
FIG. 15 is a flowchart executed by the driving assistance apparatus according to the third embodiment when providing driving assistance.

Next, an outline of processing procedures executed by the driving assistance apparatus 2 according to the third embodiment when providing driving assistance will be described. FIG. 15 is a flowchart executed by the driving assistance apparatus according to the third embodiment when providing driving assistance. When the driving assistance flow is called up while the vehicle 1 is traveling, first, a determination is made by the assistance condition determination unit 98 as to whether or not vehicle speed V≤V1 is established (step ST301).

When the assistance condition determination unit 98 determines that vehicle speed V≤V1 is established (an affirmative determination in step ST301), the other vehicle information is obtained (step ST302). The other vehicle information is obtained by the other vehicle information acquisition unit 92 of the driving assistance ECU 70 on the basis of the sound information detected by the travel sound sensors 32. In this case, information relating to other vehicles traveling on the entire periphery of the host vehicle 1, such as the preceding vehicle 120, overtaking vehicles overtaking the host vehicle 1, and oncoming vehicles opposing the host vehicle 1, is obtained as the other vehicle information.

Next, the assistance condition determination unit 98 determines, on the basis of the other vehicle information obtained by the other vehicle information acquisition unit 92, whether or not the preceding vehicle 120 is present (step ST303). When the assistance condition determination unit 98 determines that the preceding vehicle 120 is not present (a negative determination in step ST303), a determination is made as to whether or not the intersection 113 is a large intersection (step ST304). In other words, the infrastructure determination unit 85 determines whether or not the intersection 113 positioned in the vicinity of the host vehicle 1 is a large intersection on the basis of the sound information obtained by the travel sound sensors 32.

Note that the determination as to whether or not the intersection 113 is a large intersection may be made on the basis of the image information captured by the camera 31, for example, instead of the sound information. More specifically, it may be determined that the intersection 113 is a large intersection when the image information captured by the camera 31 indicates the existence of a plurality of lanes on the travel road 111.

When the infrastructure determination unit 85 determines that the intersection 113 is not a large intersection (a negative determination in step ST304), next, the driving information is obtained (step ST305). The driving information is obtained by the driving information acquisition unit 86 by detecting the condition of the turn signal switch 25 using the turn signal operation detection unit 87, obtaining a condition of the hazard switch and an illumination condition of the tail lamp using the temporary stop condition determination unit 90, and so on.

Next, a determination is made as to whether or not a condition in which a right turn signal is illuminated and continuous oncoming vehicles exist is established (step ST306). More specifically, the right/left turn waiting condition determination unit 88 determines whether or not the condition of the turn signal switch 25, detected by the turn signal operation detection unit 87, indicates illumination of the right turn signal, and the other vehicle condition obtained by the other vehicle information acquisition unit 92 indicates the existence of continuous oncoming vehicles on the right side of the host vehicle 1.

Having determined that the condition in which the right turn signal is illuminated and continuous oncoming vehicles exist is not established (a negative determination in step ST306), the right/left turn waiting condition determination unit 88 determine whether or not a condition in which a left turn signal is illuminated and continuous overtaking vehicles exist is established (step ST307). Likewise in this determination, the right/left turn waiting condition determination unit 88 determines whether or not continuous overtaking vehicles exist on the right side of the host vehicle 1 while the condition of the turn signal switch 25 indicates illumination of the left turn signal on the basis of the detection result from the turn signal operation detection unit 87 and the acquisition result of the other vehicle information acquisition unit 92.

When the right/left turn waiting condition determination unit 88 determines that the condition in which the left turn signal is illuminated and continuous overtaking vehicles exist is not established (a negative determination in step ST307), next, a determination is made as to whether or not a condition in which the hazard switch is ON, or the tail lamp is extinguished during nighttime travel, and continuous traveling vehicles exist is established (step ST308). More specifically, the temporary stop condition determination unit 90 determines whether or not the hazard switch is ON, or the tail lamp is OFF when the host vehicle 1 travels at night, and the other vehicle condition obtained by the other vehicle information acquisition unit 92 indicates the existence of continuous traveling vehicles, such as overtaking vehicles and oncoming vehicles, on the right side of the host vehicle 1.

When the temporary stop condition determination unit 90 determines that the condition in which the hazard switch is ON, or the tail lamp is extinguished during nighttime travel, and continuous traveling vehicles exist is not established (a negative determination in step ST308), the assistance apparatus is activated (step ST309). In other words, the assistance execution unit 100 of the driving assistance ECU 70 provides assistance through control for issuing a warning to the driver, braking control, and steering control. As a result, the host vehicle 1 can travel safely over the intersection 113.

When, on the other hand, it is determined that vehicle speed V≤V1 is not established (a negative determination in step ST301), or that the preceding vehicle 120 is present (an affirmative determination in step ST303), or that the intersection 113 is a large intersection (an affirmative determination in step ST304), or that the condition in which the right turn signal is illuminated and continuous oncoming vehicles exist is established (an affirmative determination in step ST306), or that the condition in which the left turn signal is illuminated and continuous overtaking vehicles exist is established (an affirmative determination in step ST307), or that the condition in which the hazard switch is ON, or the tail lamp is extinguished during nighttime travel, and continuous traveling vehicles exist is established (an affirmative determination in step ST308), the assistance condition determination unit 98 determines that the driving assistance is to be prohibited, and therefore does not activate the assistance apparatus (step ST310). In other words, the assistance execution unit 100 does not perform driving assistance control such as warning issuance control, braking control, and steering control for preventing an intersection collision between the host vehicle 1 and another moving body.

In the driving assistance apparatus 2 according to the third embodiment, described above, driving assistance is prohibited when the right/left turn waiting condition determination unit 88 determines that the vehicle 1 is in the right/left turn waiting condition, even after the vehicle speed V has fallen to or below the reference vehicle speed V1, and therefore the driving assistance can be prohibited in a situation where the driving operation of the driver is preferably prioritized. Accordingly, driving assistance can be prohibited in a travel condition in which the driver considers driving assistance to be unnecessary, even after the vehicle speed decreases, and therefore irritation caused by unnecessary driving assistance can be reduced more reliably. Hence, the intersection 113 at which driving assistance is required can be detected with an even higher degree of precision, and as a result, the driving assistance can be provided even more appropriately.

Moreover, the right/left turn waiting condition determination unit 88 determines that the vehicle 1 is in the right/left turn waiting condition when an oncoming vehicle is detected on the basis of the sound information obtained by the travel sound sensors 32 and a turn signal operation is detected by the turn signal operation detection unit 87, and therefore the right/left turn waiting condition can be determined easily. Hence, when the vehicle speed decreases, the determination as to whether or not the host vehicle 1 is in the right/left turn waiting condition can be made easily such that irritation due to unnecessary driving assistance can be reduced easily. Therefore, the intersection 113 at which driving assistance is required can be detected easily with a high degree of precision, and as a result, driving assistance can be provided appropriately.

Note that in the driving assistance apparatus 2 according to the third embodiment, the determination as to whether or not the intersection 113 is a large intersection (step ST304), the determination as to whether or not the host vehicle 1 is in the right turn waiting condition (step ST306), the determination as to whether or not the host vehicle 1 is in the left turn waiting condition (step ST307), and the determination as to whether or not the host vehicle 1 is temporarily stopped (step ST308) are performed in that order, but these determinations may be performed in a different order. Further, the control performed during driving assistance may be configured such that not all of these four determinations (ST304, ST306, ST307, ST308) are performed, i.e. such that only a part of the determinations is performed or such that any one of the determinations is performed alone.

Fourth Embodiment

The driving assistance apparatus 2 according to a fourth embodiment is configured substantially identically to the driving assistance apparatus 2 according to the first embodiment, but differs in that the determination as to whether or not to execute the driving assistance includes determining an operating condition of an assistance request switch. All other configurations are identical to the first embodiment, and therefore description of these configurations has been omitted while identical reference numerals are attached thereto.

Figure 16:
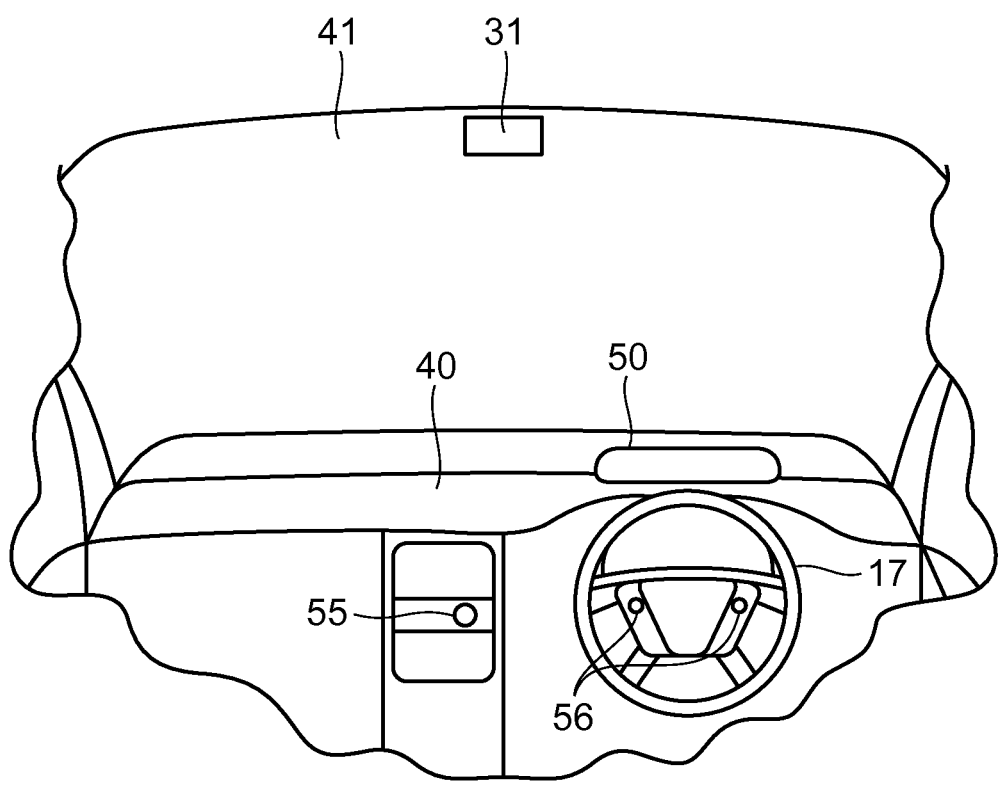
FIG. 16 is a schematic view showing a driving seat of a vehicle installed with a driving assistance apparatus according to a fourth embodiment.
Figure 17:
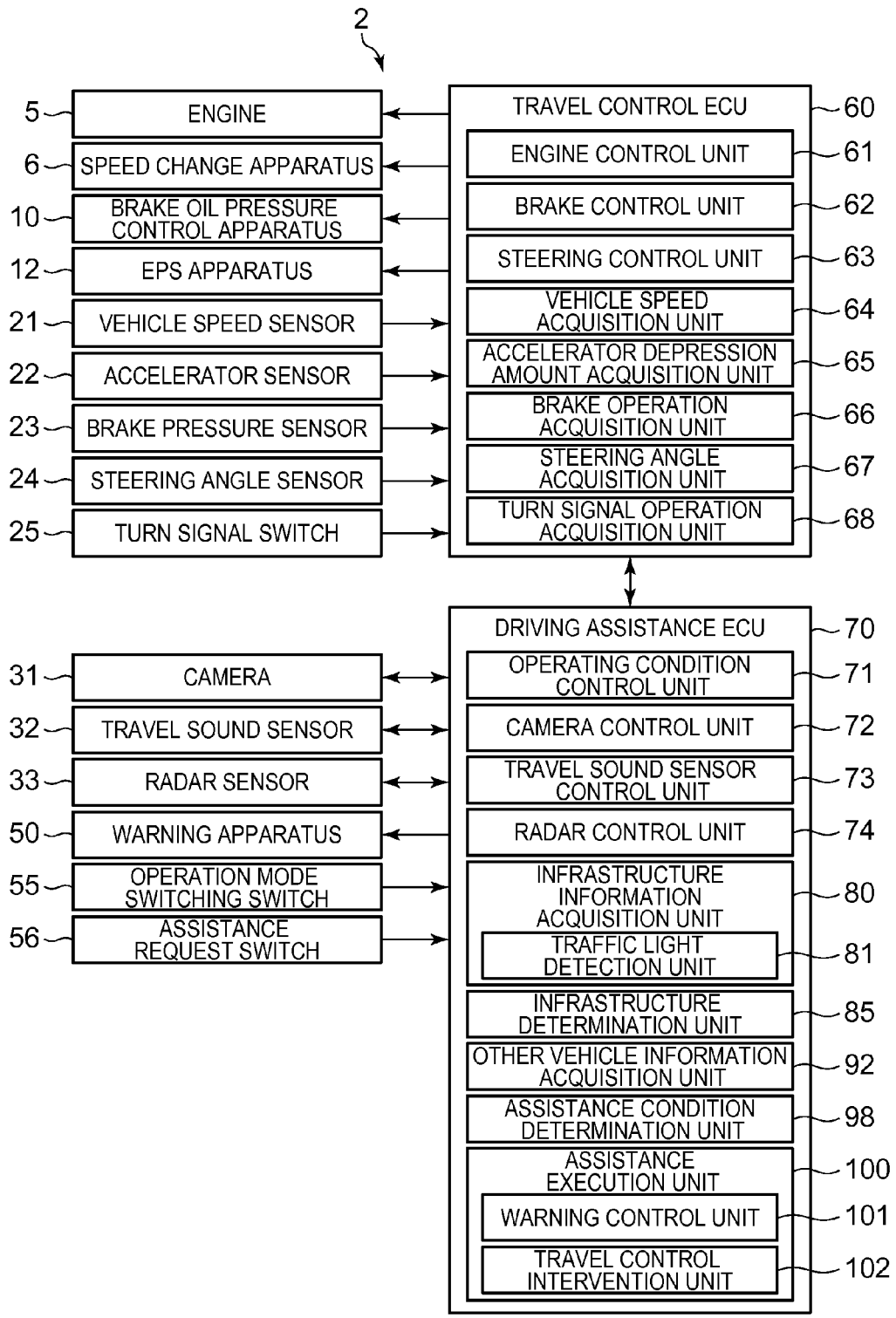
FIG. 17 is a view showing main parts of a configuration of the driving assistance apparatus according to the fourth embodiment.

FIG. 16 is a schematic view showing a driving seat of the vehicle installed with the driving assistance apparatus according to the fourth embodiment. FIG. 17 is a view showing main parts of the configuration of the driving assistance apparatus according to the fourth embodiment. The driving assistance apparatus 2 according to the fourth embodiment, similarly to the driving assistance apparatus 2 according to the first embodiment, includes the travel control ECU 60 and the driving assistance ECU 70, and is capable of providing driving assistance after determining whether or not the vehicle 1 is stopped at the intersection 113 at which driving assistance is required on the basis of the infrastructure condition, the travel condition of the vehicle 1, and so on. Furthermore, in the driving assistance apparatus 2 according to the fourth embodiment, the need for driving assistance can be switched in response to an operation performed by the driver.

More specifically, an operation mode switching switch 55 for switching an operation mode of the driving assistance apparatus 2 is provided in the interior of the vehicle 1 installed with the driving assistance apparatus 2 according to the fourth embodiment. In the driving assistance apparatus 2 according to the fourth embodiment, the operation mode can be switched between an automatic mode in which the driving assistance apparatus 2 is operated automatically and a manual mode in which the driver switches the driving assistance apparatus 2 ON and OFF, and the operation mode switching switch 55 serves as a switch for switching between the automatic mode and the manual mode. Further, an assistance request switch 56 that can be switched ON and OFF when the operation mode switching switch 55 is switched to the manual mode such that driving assistance can be activated and stopped in accordance with the wishes of the driver is disposed on the steering wheel 17.

The operation mode switching switch 55 and the assistance request switch 56 are both connected to the driving assistance ECU 70. The driving assistance ECU 70 includes an operating condition control unit 71 that controls an operating condition of the driving assistance control on the basis of the respective conditions of the operation mode switching switch 55 and the assistance request switch 56.

Actions of the driving assistance apparatus 2 according to the fourth embodiment, having the above configuration, will now be described. Similarly to the driving assistance apparatus 2 according to the first embodiment, while the vehicle 1 travels, the driving assistance apparatus 2 according to the fourth embodiment determines whether or not the predetermined assistance activation conditions are satisfied, and executes driving assistance after determining that the assistance activation conditions are satisfied. Further, the driving assistance apparatus 2 according to the fourth embodiment executes driving assistance when the assistance condition determination unit 98 determines that the conditions for performing driving assistance are satisfied in a condition where driving assistance is switched to an activated condition by the operation mode switching switch 55 and the assistance request switch 56.

More specifically, by switching the operation mode switching switch 55, the driving assistance can be executed by the driving assistance apparatus 2 either automatically when the vehicle 1 enters the intersection 113, or in accordance with the wishes of the driver. The operation mode switching switch 55 can be switched between the automatic mode, in which the driving assistance is executed automatically in accordance with the condition of the host vehicle 1 and the peripheral environment when the vehicle 1 enters the intersection 113, and the manual mode, in which the driver can choose whether or not to execute the driving assistance when entering the intersection 113.

Further, by switching the assistance request switch 56 disposed on the steering wheel 17 ON and OFF in a case where the operation mode switching switch 55 is switched to the manual mode, driving assistance performed when the vehicle 1 enters the intersection 113 can be switched ON and OFF. The respective conditions of the operation mode switching switch 55 and the assistance request switch 56 are obtained by the operating condition control unit 71 of the driving assistance ECU 70, and the driving assistance ECU 70 performs driving assistance control in accordance with the switch Conditions obtained by the operating condition control unit 71.

More specifically, in a case where the operation mode switching switch 55 is in the automatic mode or a case where the operation mode switching switch 55 is in the manual mode and the assistance request switch 56 is ON, the operating condition control unit 71 causes the assistance execution unit 100 to execute driving assistance when the vehicle 1 enters the intersection 113. In a case where the operation mode switching switch 55 is in the manual mode and the assistance request switch 56 is OFF, on the other hand, the operating condition control unit 71 does not cause the assistance execution unit 100 to execute driving assistance.

Hence, when the operation mode switching switch 55 is switched to the automatic mode, the driving assistance apparatus 2 performs driving assistance control every time it is determined, on the basis of the travel condition of the vehicle 1 and the driving condition of the driver, that the vehicle 1 is about to enter the intersection 113 at which driving assistance is required.

In a case where the operation mode switching switch 55 is switched to the manual mode, on the other hand, the driving assistance apparatus 2 performs driving assistance control when the host vehicle 1 enters the intersection 113 at which driving assistance is determined to be required while the assistance request switch 56 is ON. Further, when the operation mode switching switch 55 is switched to the manual mode but the assistance request switch 56 is OFF, the driving assistance apparatus 2 does not perform driving assistance control even after the vehicle 1 enters the intersection 113 at which driving assistance is determined to be required.

Figure 18:
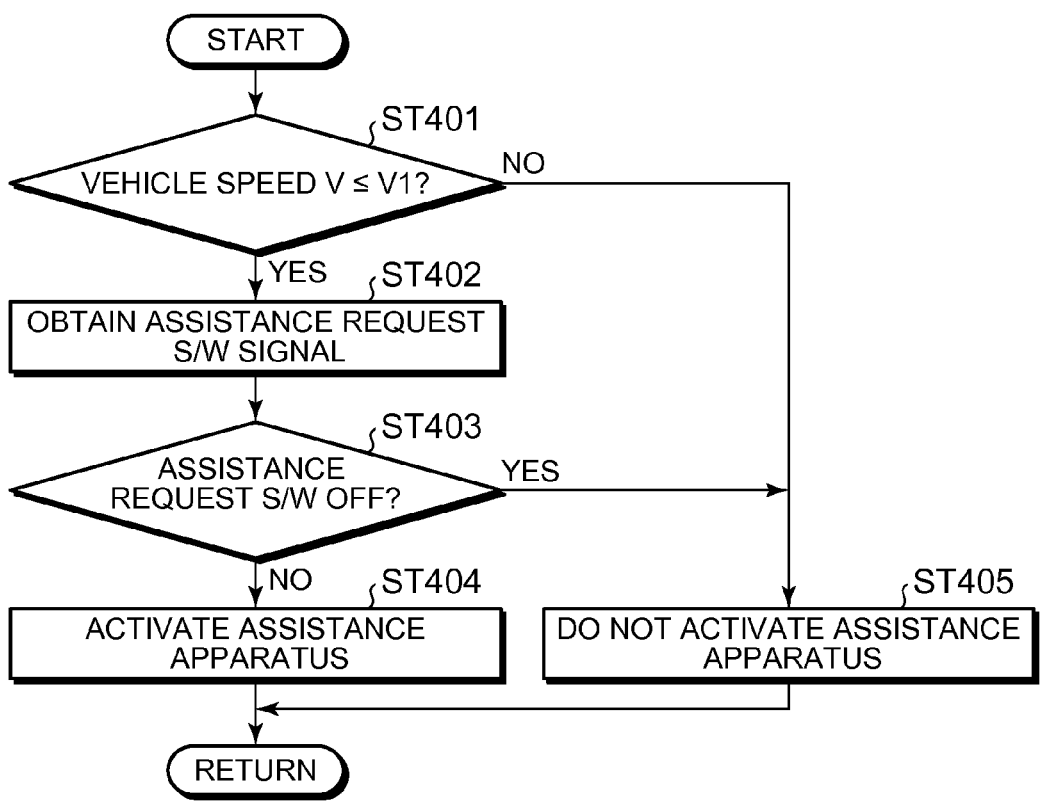
FIG. 18 is a flowchart executed by the driving assistance apparatus according to the fourth embodiment when providing driving assistance.

Next, an outline of processing procedures executed by the driving assistance apparatus 2 according to the fourth embodiment when providing driving assistance will be described. FIG. 18 is a flowchart executed by the driving assistance apparatus according to the fourth embodiment when providing driving assistance. When the driving assistance flow is called up while the vehicle 1 is traveling, first, a determination is made by the assistance condition determination unit 98 as to whether or not vehicle speed V≤V1 is established (step ST401).

When the assistance condition determination unit 98 determines that vehicle speed V≤V1 is established (an affirmative determination in step ST401), next, a signal is obtained from the assistance request switch 56 (step ST402). The signal from the assistance request switch 56 is obtained by the operating condition control unit 71 of the driving assistance ECU 70.

Next, a determination is made as to whether or not the assistance request switch 56 is OFF (step ST403). In other words, the assistance condition determination unit 98 determines whether or not the signal obtained by the operating condition control unit 71 from the assistance request switch 56 is OFF.

When the assistance condition determination unit 98 determines that the assistance request switch 56 is not OFF (a negative determination in step ST403), the assistance apparatus is activated (step ST404). More specifically, when the assistance request switch 56 is ON, it can be determined that the driver has requested driving assistance, and therefore the assistance execution unit 100 of the driving assistance ECU 70 provides assistance through control for issuing a warning to the driver, braking control, and steering control. As a result, the host vehicle 1 can travel safely over the intersection 113.

When, on the other hand, it is determined that vehicle speed V≤V1 is not established (a negative determination in step ST401), or that the assistance request switch 56 is OFF (an affirmative determination in step ST403), the assistance condition determination unit 98 determines that the driving assistance is to be prohibited, and accordingly does not activate the assistance apparatus (step ST405). In other words, the assistance execution unit 100 does not perform driving assistance control such as warning issuance control, braking control, and steering control.

In the driving assistance apparatus 2 according to the fourth embodiment, described above, the driving assistance is prohibited when the assistance request switch 56 is OFF, even after the vehicle speed V falls to or below the reference vehicle speed V1, and therefore the driving assistance can be prohibited in a case where the driver wishes to stop the driving assistance. Accordingly, the driving assistance can be prohibited in a travel condition in which the driver considers the driving assistance to be unnecessary, even after the vehicle speed decreases, and therefore irritation caused by unnecessary driving assistance can be reduced more reliably. Hence, the intersection 113 at which driving assistance is required can be detected with an even higher degree of precision, and as a result, the driving assistance can be provided even more appropriately.

Modified Examples

In the driving assistance apparatuses 2 according to the first to fourth embodiments, described above, the driving assistance is prohibited when the vehicle speed V has not fallen to or below the reference vehicle speed V1, when the preceding vehicle 120, the traffic light 116, or the railway crossing 131 exists even after the vehicle speed V has fallen to or below the reference vehicle speed V1, when the vehicle 1 is stopped at the toll booth 140, or when the vehicle 1 is in the right/left turn waiting condition or is temporarily stopped. However, the driving assistance need not be prohibited in these cases.

In these cases, the driving assistance may be executed at a weaker assistance level. More specifically, in the driving assistance apparatuses 2 according to the first to fourth embodiments described above, when the conditions for determining that the assistance apparatus is not to be activated are satisfied, the driving assistance may be executed at a weaker assistance level than when the conditions for determining that the assistance apparatus is to be activated are satisfied. By weakening the assistance level rather than prohibiting the driving assistance, irritation caused by driving assistance performed when the driver does not greatly desire the driving assistance can likewise be reduced.

Furthermore, in the driving assistance apparatuses 2 according to the first to fourth embodiments described above, the presence of the traffic light 116, the railway crossing 131, the toll gate 142, another vehicle such as the preceding vehicle 120, and so on is determined on the basis of the sound information detected by the travel sound sensors 32, but the presence of infrastructure and other vehicles may be determined on the basis of information other than the sound information. The presence of infrastructure, other vehicles, and so on may be determined on the basis of the image information captured by the camera 31 and the three-dimensional information detected by the radar sensor 33. In other words, the traffic light detection unit 81, the railway crossing detection unit 82, the toll booth detection unit 83, and the other vehicle information acquisition unit 92 may detect infrastructure such as the traffic light 116, the railway crossing 131, and the toll gate 142 and another vehicle such as the preceding vehicle 120, an overtaking vehicle, or an oncoming vehicle on the basis of the image information captured by the camera 31 and the three-dimensional information detected by the radar sensor 33.

Figure 19:
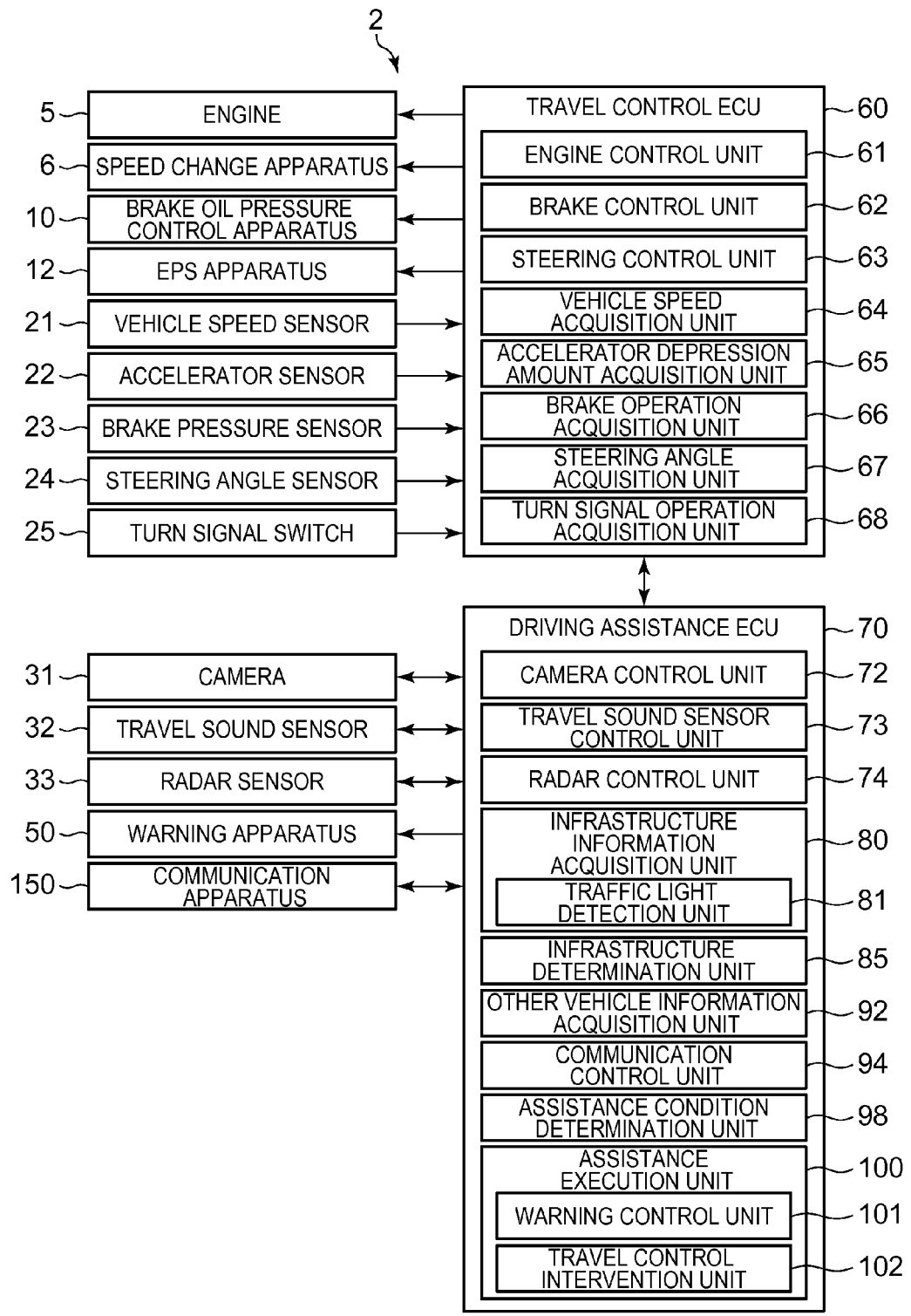
FIG. 19 is a view showing main parts of a configuration of a modified example of the driving assistance apparatus according to the first embodiment.

FIG. 19 is a view showing main parts of a configuration of a modified example of the driving assistance apparatus according to the first embodiment. Other vehicles may also be detected using communication, for example, instead of detecting conditions on the periphery of the host vehicle 1 using the sound information, image information, and so on. In this case, the host vehicle 1 is provided with a communication apparatus 150 capable of exchanging information with another vehicle, and the driving assistance ECU 70 is provided with a communication control unit 94 that controls the communication performed by the communication apparatus 150. As a result, when another vehicle with which vehicle-to-vehicle communication is possible exists on the periphery of the host vehicle 1, information relating to this other vehicle can be obtained through vehicle-to-vehicle communication.

Hence, when the preceding vehicle 120 traveling in front of the host vehicle 1 is capable of vehicle-to-vehicle communication, for example, the assistance condition determination unit 98 can detect the preceding vehicle 120 on the basis of information transmitted from the preceding vehicle 120 and received by the communication apparatus 150. As a result, the existence of the preceding vehicle 120 can be determined more reliably, and therefore, by prohibiting the driving assistance when the preceding vehicle 120 is detected by the communication apparatus 150 and the communication control unit 94, even after the vehicle speed V has fallen to or below the reference vehicle speed V1, driver irritation caused by unnecessary driving assistance can be reduced even more reliably.

Further, the infrastructure information indicating the presence of the traffic light 116, the railway crossing 131, and so on may be detected using a car navigation system installed in the vehicle 1, for example, instead of detecting conditions on the periphery of the host vehicle 1 from the sound information, the image information, and so on. With a car navigation system, the position of the host vehicle 1 on a map can be recognized using a global positioning system (GPS), and therefore the existence of the traffic light 116, the railway crossing 131, and so on in the advancement direction of the host vehicle 1 can be detected.

Furthermore, in the driving assistance apparatuses 2 according to the first to fourth embodiments, described above, the need for the driving assistance is determined on the basis of the vehicle speed, the infrastructure information, and the other vehicle information, but the sequence of determinations is not limited to those described above. Regardless of the determination sequence, by determining the need to execute driving assistance on the basis of the infrastructure information, the other vehicle information, and so on when the vehicle speed decreases, driver irritation caused by unnecessary driving assistance can be reduced, and as a result, the driving assistance can be performed appropriately.

Moreover, the configurations, control, and so on employed in the first to fourth embodiments and the modified examples of the driving assistance apparatus 2 may be combined appropriately, and configurations and control other than those described above may also be employed. Regardless of the configuration and control method of the driving assistance apparatus 2, by determining the need to execute driving assistance on the basis of information relating to an intersection in front of the vehicle 1, preceding vehicle information, and so on when the vehicle speed decreases, the intersection 113 at which the driving assistance is required can be detected with a high degree of precision, and as a result, the driving assistance can be performed more appropriately.

1 vehicle
2 driving assistance apparatus
5 engine
10 brake oil pressure control apparatus
12 EPS apparatus
18 turn signal lever
21 vehicle speed sensor
25 turn signal switch
31 camera (image capturing means)
32 travel sound sensor (sound collecting means)
33 radar sensor (three-dimensional information obtaining means)
50 warning apparatus
55 operating mode switching switch 56 assistance request switch
60 travel control ECU
61 engine control unit
62 brake control unit
63 steering control unit
64 vehicle speed acquisition unit (vehicle speed obtaining means)
68 turn signal operation acquisition unit
70 driving assistance ECU
71 operating condition control unit
72 camera control unit
73 travel sound sensor control unit
74 radar control unit
80 infrastructure information acquisition unit
81 traffic light detection unit (traffic light detecting means)
82 railway crossing detection unit
83 toll booth detection unit
85 infrastructure determination unit
86 driving information acquisition unit
87 turn signal operation detection unit (turn signal operation detecting means)
88 right/left turn waiting condition determination unit (right/left turn waiting condition determining means)
90 temporary stop condition determination unit
92 other vehicle information acquisition unit
94 communication control unit
98 assistance condition determination unit (assistance condition determining means)
100 assistance execution unit (driving assistance means)
111 travel road
113 railway crossing
114 unsignalized intersection
116 traffic light
120 preceding vehicle
131 railway crossing
140 toll booth
142 toll gate
150 communication apparatus (communicating means)

The invention claimed is:

1. A driving assistance apparatus comprising:
a vehicle speed obtaining unit configured to obtain information indicating a vehicle speed of a vehicle;
an assistance condition determining unit configured to determine whether or not an assistance activation condition, which is a condition for providing a driver of the vehicle with driving assistance, is satisfied on the basis of whether or not the vehicle speed obtained by the vehicle speed obtaining unit is equal to or lower than a reference vehicle speed, and on the basis of information relating to an intersection or a preceding vehicle in front of the vehicle;
a driving assistance unit configured to execute, as the driving assistance, assistance including at least one of warning issuance to the driver, braking control, and steering control when the assistance condition determining unit determines that the assistance activation condition is satisfied;
a traffic light detecting unit configured to detect the traffic light; and
a sound collecting unit configured to obtain information relating to sounds on a periphery of the vehicle, including information relating to a sound emitted by the traffic light, wherein:
the assistance condition determining unit determines that the assistance activation condition is satisfied when the vehicle speed is equal to or lower than the reference vehicle speed, the intersection in front of the vehicle is an unsignalized intersection, which is an intersection at which a traffic light is not disposed, and a travel condition of the vehicle is such that the vehicle is stopped at the unsignalized intersection or about to enter the unsignalized intersection;
the assistance condition determining unit prohibits the driving assistance when the traffic light detecting unit detects the traffic light within a predetermined distance of the vehicle, even if the vehicle speed is equal to or lower than the reference vehicle speed; and
the traffic light detecting unit detects the traffic light on the basis of the information relating to the sound emitted by the traffic light, which is included in the sound information obtained by the sound collecting unit.

2. The driving assistance apparatus according to claim 1, wherein the assistance condition determining unit prohibits the driving assistance when the travel condition of the vehicle is such that the vehicle is not stopped at the unsignalized intersection or not about to enter the unsignalized intersection, even if the vehicle speed is equal to or lower than the reference vehicle speed.

3. The driving assistance apparatus according to claim 1, wherein when the vehicle speed is equal to or lower than the reference vehicle speed but the travel condition of the vehicle is such that the vehicle is not stopped at the unsignalized intersection or not about to enter the unsignalized intersection, the driving assistance unit weakens an assistance level of the driving assistance in comparison with a case where the travel condition of the vehicle is such that the vehicle is stopped at the unsignalized intersection or about to enter the unsignalized intersection.

4. The driving assistance apparatus according to claim 1, further comprising an image capturing unit configured to obtain image information from a periphery of the vehicle, wherein the traffic light detecting unit detects the traffic light on the basis of the image information obtained by the image capturing unit.

5. The driving assistance apparatus according to claim 1, wherein the assistance condition determining unit determines that the assistance activation condition is satisfied when the vehicle speed is equal to or lower than the reference vehicle speed and a preceding vehicle is not detected within a predetermined distance of the vehicle.

6. The driving assistance apparatus according to claim 5, wherein the assistance condition determining unit prohibits the driving assistance when the preceding vehicle is detected within the predetermined distance of the vehicle, even if the vehicle speed is equal to or lower than the reference vehicle speed.

7. The driving assistance apparatus according to claim 5, wherein when the vehicle speed is equal to or lower than the reference vehicle speed and the preceding vehicle is detected within the predetermined distance of the vehicle, the driving assistance unit weakens an assistance level of the driving assistance in comparison with a case where the preceding vehicle is not detected within the predetermined distance of the vehicle.

8. The driving assistance apparatus according to claim 5, wherein the assistance condition determining unit detects the preceding vehicle on the basis of information relating to a sound emitted by the preceding vehicle, which is included in the sound information obtained by the sound collecting unit.

9. The driving assistance apparatus according to claim 5, further comprising an image capturing unit configured to obtain image information from a periphery of the vehicle, wherein the assistance condition determining unit detects the preceding vehicle on the basis of the image information obtained by the image capturing unit.

10. The driving assistance apparatus according to claim 5, further comprising a three-dimensional information obtaining unit configured to obtain three-dimensional information relating to an object on a periphery of the vehicle using detection waves,
wherein the assistance condition determining unit detects the preceding vehicle on the basis of the three-dimensional information obtained by the three-dimensional information obtaining unit.

11. The driving assistance apparatus according to claim 5, further comprising a communicating unit configured to exchange information with another vehicle,
wherein the assistance condition determining unit detects the preceding vehicle on the basis of information transmitted from the preceding vehicle and received by the communicating unit.

12. The driving assistance apparatus according to claim 1, wherein when the vehicle speed is equal to or lower than the reference vehicle speed and a railway crossing is detected within a predetermined distance of the vehicle, the driving assistance unit weakens an assistance level of the driving assistance in comparison with a case where the railway crossing is not detected within the predetermined distance of the vehicle.

13. The driving assistance apparatus according to claim 1, wherein when the vehicle speed is equal to or lower than the reference vehicle speed and a toll gate is detected within a predetermined distance of the vehicle, the driving assistance unit weakens an assistance level of the driving assistance in comparison with a case where the toll gate is not detected within the predetermined distance of the vehicle.

14. The driving assistance apparatus according to claim 1, further comprising a right/left turn waiting condition determining unit configured to determine whether or not the vehicle is in a right/left turn waiting condition,
wherein the assistance condition determining unit prohibits the driving assistance when the right/left turn waiting condition determining unit determines that the vehicle is in the right/left turn waiting condition, even if the vehicle speed is equal to or lower than the reference vehicle speed.

15. The driving assistance apparatus according to claim 14, further comprising:
a turn signal operation detecting unit configured to detect a turn signal operation performed by the driver,
wherein the right/left turn waiting condition determining unit determines that the vehicle is in the right/left turn waiting condition when an oncoming vehicle is detected on the basis of the sound information obtained by the sound collecting unit and the turn signal operation is detected by the turn signal operation detecting unit.

16. The driving assistance apparatus according to claim 14, further comprising:
an image capturing unit configured to obtain image information from a periphery of the vehicle; and
a turn signal operation detecting unit configured to detect a turn signal operation performed by the driver,
wherein the right/left turn waiting condition determining unit determines that the vehicle is in the right/left turn waiting condition when an oncoming vehicle is detected on the basis of the image information obtained by the image capturing unit and the turn signal operation is detected by the turn signal operation detecting unit.

17. The driving assistance apparatus according to claim 14, further comprising:
a three-dimensional information obtaining unit configured to obtain three-dimensional information relating to an object on a periphery of the vehicle using detection waves; and
a turn signal operation detecting unit configured to detect a turn signal operation performed by the driver,
wherein the right/left turn waiting condition determining unit determines that the vehicle is in the right/left turn waiting condition when an oncoming vehicle is detected on the basis of the three-dimensional information obtained by the three-dimensional information obtaining unit and the turn signal operation is detected by the turn signal operation detecting unit.

18. The driving assistance apparatus according to claim 1, further comprising a right/left turn waiting condition determining unit configured to determine whether or not the vehicle is in a right/left turn waiting condition,
wherein, when the vehicle speed is equal to or lower than the reference vehicle speed and the vehicle is determined by the right/left turn waiting condition determining unit to be in the right/left turn waiting condition, the driving assistance unit weakens an assistance level of the driving assistance in comparison with a case where the vehicle is determined not to be in the right/left turn waiting condition.

19. The driving assistance apparatus according to claim 18, further comprising:
an image capturing unit configured to obtain image information from a periphery of the vehicle; and
a turn signal operation detecting unit configured to detect a turn signal operation performed by the driver,
wherein the right/left turn waiting condition determining unit determines that the vehicle is in the right/left turn waiting condition when an oncoming vehicle is detected on the basis of the image information obtained by the image capturing unit and the turn signal operation is detected by the turn signal operation detecting unit.

20. The driving assistance apparatus according to claim 18, further comprising:
a three-dimensional information obtaining unit configured to obtain three-dimensional information relating to an object on a periphery of the vehicle using detection waves; and
a turn signal operation detecting unit configured to detect a turn signal operation performed by the driver,
wherein the right/left turn waiting condition determining unit determines that the vehicle is in the right/left turn waiting condition when an oncoming vehicle is detected on the basis of the three-dimensional information obtained by the three-dimensional information obtaining unit and the turn signal operation is detected by the turn signal operation detecting unit.

21. The driving assistance apparatus according to claim 18, further comprising:
a turn signal operation detecting unit configured to detect a turn signal operation performed by the driver,
wherein the right/left turn waiting condition determining unit determines that the vehicle is in the right/left turn waiting condition when an oncoming vehicle is detected on the basis of the sound information obtained by the sound collecting unit and the turn signal operation is detected by the turn signal operation detecting unit.

22. A driving assistance apparatus comprising:
a vehicle speed obtaining unit configured to obtain information indicating a vehicle speed of a vehicle;

an assistance condition determining unit configured to determine whether or not an assistance activation condition, which is a condition for providing a driver of the vehicle with driving assistance, is satisfied on the basis of whether or not the vehicle speed obtained by the vehicle speed obtaining unit is equal to or lower than a reference vehicle speed, and on the basis of information relating to an intersection or a preceding vehicle in front of the vehicle;

a driving assistance unit configured to execute, as the driving assistance, assistance including at least one of warning issuance to the driver, braking control, and steering control when the assistance condition determining unit determines that the assistance activation condition is satisfied;

a traffic light detecting unit configured to detect the traffic light; and a sound collecting unit configured to obtain information relating to sounds on a periphery of the vehicle, including information relating to a sound emitted by the traffic light, wherein:

the assistance condition determining unit determines that the assistance activation condition is satisfied when the vehicle speed is equal to or lower than the reference vehicle speed, the intersection in front of the vehicle is an unsignalized intersection, which is an intersection at which a traffic light is not disposed, and a travel condition of the vehicle is such that the vehicle is stopped at the unsignalized intersection or about to enter the unsignalized intersection;

when the traffic light detecting unit detects the traffic light within a predetermined distance of the vehicle and when the assistance condition determining unit determines that the assistance activation condition is satisfied, the driving assistance unit weakens an assistance level of the driving assistance in comparison with a case where the traffic light is not detected within the predetermined distance of the vehicle; and the traffic light detecting unit detects the traffic light on the basis of the information relating to the sound emitted by the traffic light, which is included in the sound information obtained by the sound collecting unit.

23. The driving assistance apparatus according to claim 22, wherein the assistance condition determining unit prohibits the driving assistance when the travel condition of the vehicle is such that the vehicle is not stopped at the unsignalized intersection or not about to enter the unsignalized intersection, even if the vehicle speed is equal to or lower than the reference vehicle speed.

24. The driving assistance apparatus according to claim 22, wherein when the vehicle speed is equal to or lower than the reference vehicle speed but the travel condition of the vehicle is such that the vehicle is not stopped at the unsignalized intersection or not about to enter the unsignalized intersection, the driving assistance unit weakens an assistance level of the driving assistance in comparison with a case where the travel condition of the vehicle is such that the vehicle is stopped at the unsignalized intersection or about to enter the unsignalized intersection.

25. The driving assistance apparatus according to claim 22, further comprising an image capturing unit configured to obtain image information from a periphery of the vehicle, wherein the traffic light detecting unit detects the traffic light on the basis of the image information obtained by the image capturing unit.

26. The driving assistance apparatus according to claim 22, wherein the assistance condition determining unit determines that the assistance activation condition is satisfied when the vehicle speed is equal to or lower than the reference vehicle speed and a preceding vehicle is not detected within a predetermined distance of the vehicle.

27. The driving assistance apparatus according to claim 26, wherein the assistance condition determining unit prohibits the driving assistance when the preceding vehicle is detected within the predetermined distance of the vehicle, even if the vehicle speed is equal to or lower than the reference vehicle speed.

28. The driving assistance apparatus according to claim 26, wherein when the vehicle speed is equal to or lower than the reference vehicle speed and the preceding vehicle is detected within the predetermined distance of the vehicle, the driving assistance unit weakens an assistance level of the driving assistance in comparison with a case where the preceding vehicle is not detected within the predetermined distance of the vehicle.

29. The driving assistance apparatus according to claim 26, wherein the assistance condition determining unit detects the preceding vehicle on the basis of information relating to a sound emitted by the preceding vehicle, which is included in the sound information obtained by the sound collecting unit.

30. The driving assistance apparatus according to claim 26, further comprising an image capturing unit configured to obtain image information from a periphery of the vehicle, wherein the assistance condition determining unit detects the preceding vehicle on the basis of the image information obtained by the image capturing unit.

31. The driving assistance apparatus according to claim 26, further comprising a three-dimensional information obtaining unit configured to obtain three-dimensional information relating to an object on a periphery of the vehicle using detection waves, wherein the assistance condition determining unit detects the preceding vehicle on the basis of the three-dimensional information obtained by the three-dimensional information obtaining unit.

32. The driving assistance apparatus according to claim 26, further comprising a communicating unit configured to exchange information with another vehicle, wherein the assistance condition determining unit detects the preceding vehicle on the basis of information transmitted from the preceding vehicle and received by the communicating unit.

33. The driving assistance apparatus according to claim 22, wherein when the vehicle speed is equal to or lower than the reference vehicle speed and a railway crossing is detected within a predetermined distance of the vehicle, the driving assistance unit weakens an assistance level of the driving assistance in comparison with a case where the railway crossing is not detected within the predetermined distance of the vehicle.

34. The driving assistance apparatus according to claim 22, wherein when the vehicle speed is equal to or lower than the reference vehicle speed and a toll gate is detected within a predetermined distance of the vehicle, the driving assistance unit weakens an assistance level of the driving assistance in comparison with a case where the toll gate is not detected within the predetermined distance of the vehicle.

35. The driving assistance apparatus according to claim 22, further comprising a right/left turn waiting condition determining unit configured to determine whether or not the vehicle is in a right/left turn waiting condition, wherein the assistance condition determining unit prohibits the driving assistance when the right/left turn waiting condition determining unit determines that the vehicle is in the right/left turn waiting condition, even if the vehicle speed is equal to or lower than the reference vehicle speed.

36. The driving assistance apparatus according to claim 35, further comprising:
a turn signal operation detecting unit configured to detect a turn signal operation performed by the driver,
wherein the right/left turn waiting condition determining unit determines that the vehicle is in the right/left turn waiting condition when an oncoming vehicle is detected on the basis of the sound information obtained by the sound collecting unit and the turn signal operation is detected by the turn signal operation detecting unit.

37. The driving assistance apparatus according to claim 35, further comprising:
an image capturing unit configured to obtain image information from a periphery of the vehicle; and
a turn signal operation detecting unit configured to detect a turn signal operation performed by the driver,
wherein the right/left turn waiting condition determining unit determines that the vehicle is in the right/left turn waiting condition when an oncoming vehicle is detected on the basis of the image information obtained by the image capturing unit and the turn signal operation is detected by the turn signal operation detecting unit.

38. The driving assistance apparatus according to claim 35, further comprising:
a three-dimensional information obtaining unit configured to obtain three-dimensional information relating to an object on a periphery of the vehicle using detection waves; and
a turn signal operation detecting unit configured to detect a turn signal operation performed by the driver,
wherein the right/left turn waiting condition determining unit determines that the vehicle is in the right/left turn waiting condition when an oncoming vehicle is detected on the basis of the three-dimensional information obtained by the three-dimensional information obtaining unit and the turn signal operation is detected by the turn signal operation detecting unit.

39. The driving assistance apparatus according to claim 22, further comprising a right/left turn waiting condition determining unit configured to determine whether or not the vehicle is in a right/left turn waiting condition,
wherein, when the vehicle speed is equal to or lower than the reference vehicle speed and the vehicle is determined by the right/left turn waiting condition determining unit to be in the right/left turn waiting condition, the driving assistance unit weakens an assistance level of the driving assistance in comparison with a case where the vehicle is determined not to be in the right/left turn waiting condition.

40. The driving assistance apparatus according to claim 39, further comprising:
a turn signal operation detecting unit configured to detect a turn signal operation performed by the driver,
wherein the right/left turn waiting condition determining unit determines that the vehicle is in the right/left turn waiting condition when an oncoming vehicle is detected on the basis of the sound information obtained by the sound collecting unit and the turn signal operation is detected by the turn signal operation detecting unit.

41. The driving assistance apparatus according to claim 39, further comprising:
an image capturing unit configured to obtain image information from a periphery of the vehicle; and
a turn signal operation detecting unit configured to detect a turn signal operation performed by the driver,
wherein the right/left turn waiting condition determining unit determines that the vehicle is in the right/left turn waiting condition when an oncoming vehicle is detected on the basis of the image information obtained by the image capturing unit and the turn signal operation is detected by the turn signal operation detecting unit.

42. The driving assistance apparatus according to claim 39, further comprising:
a three-dimensional information obtaining unit configured to obtain three-dimensional information relating to an object on a periphery of the vehicle using detection waves; and
a turn signal operation detecting unit configured to detect a turn signal operation performed by the driver,
wherein the right/left turn waiting condition determining unit determines that the vehicle is in the right/left turn waiting condition when an oncoming vehicle is detected on the basis of the three-dimensional information obtained by the three-dimensional information obtaining unit and the turn signal operation is detected by the turn signal operation detecting unit.

* * * * *